US007274890B2

(12) United States Patent
Uchida et al.

(10) Patent No.: US 7,274,890 B2
(45) Date of Patent: Sep. 25, 2007

(54) IMAGE PROCESSING APPARATUS AND IMAGE PROCESSING METHOD FOR DISTINGUISHING BETWEEN AN ORIGINAL PRINT PRODUCT AND A COPY OF THE PRINT PRODUCT

(75) Inventors: Tatsuro Uchida, Kanagawa (JP); Hiroshi Oomura, Kanagawa (JP); Yasuhiro Kujirai, Tokyo (JP); Yoshihiro Takagi, Kanagawa (JP); Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/557,648

(22) Filed: Nov. 8, 2006

(65) Prior Publication Data

US 2007/0065208 A1 Mar. 22, 2007

Related U.S. Application Data

(63) Continuation of application No. 10/959,873, filed on Oct. 6, 2004, now Pat. No. 7,149,451.

(30) Foreign Application Priority Data

| Oct. 10, 2003 | (JP) | ............................. 2003-352978 |
| Oct. 10, 2003 | (JP) | ............................. 2003-352979 |
| Jul. 30, 2004 | (JP) | ............................. 2004-224783 |

(51) Int. Cl.
*G03G 15/00* (2006.01)

(52) U.S. Cl. ........................ 399/81; 399/366; 283/902; 715/527

(58) Field of Classification Search ................. 399/81, 399/158, 366; 283/72, 902; 430/10; 380/51, 380/55, 243; 358/1.14; 726/33; 715/527
See application file for complete search history.

(56) References Cited

U.S. PATENT DOCUMENTS

| 5,788,285 | A  | * | 8/1998  | Wicker ........................ 283/93 |
| 6,000,728 | A  | * | 12/1999 | Mowry, Jr. .................. 283/93 |
| 6,512,915 | B2 | * | 1/2003  | Matsunoshita et al. ..... 399/366 |
| 6,865,001 | B2 | * | 3/2005  | Long et al. .................... 359/2 |

(Continued)

FOREIGN PATENT DOCUMENTS

JP         08212348 A  *  8/1996

(Continued)

*Primary Examiner*—Robert Beatty
(74) *Attorney, Agent, or Firm*—Canon U.S.A., Inc. I.P. Division

(57) ABSTRACT

An information processing device allows for user recognition of the difference between a print product (original) and a copy product of the print product. The information processing device includes a receiving unit which receives a character string which is concealed on a print product and appears on a copy product of the print product; a generating unit which generates printing data in which dots are concentrated into masses in a first area and dots are distributed in a second area and in which either of the first area and the second area is based on the received character string, such that the print product is produced by an image forming device; and a display controlling unit which controls display of first image data and second image data, wherein the second image data is different from the first image data, and the received character string appears in the second image data.

23 Claims, 30 Drawing Sheets

U.S. PATENT DOCUMENTS

| | | | |
|---|---|---|---|
| 7,149,451 B2 * | 12/2006 | Uchida et al. | 399/81 |
| 2004/0051885 A1 * | 3/2004 | Matsunoshita | 358/1.9 |
| 2005/0058476 A1 * | 3/2005 | Murakami | 399/366 |
| 2005/0078331 A1 * | 4/2005 | Guan et al. | 358/1.14 |
| 2005/0078993 A1 * | 4/2005 | Oomura et al. | 399/366 |
| 2005/0135856 A1 * | 6/2005 | Uchida et al. | 399/411 |
| 2005/0162682 A1 * | 7/2005 | Aritomi et al. | 358/1.14 |
| 2005/0190411 A1 * | 9/2005 | Ohno | 358/3.28 |

FOREIGN PATENT DOCUMENTS

| | | | |
|---|---|---|---|
| JP | 10278408 A | * | 10/1998 |
| JP | 11098345 A | * | 4/1999 |
| JP | 2000-182086 A | | 6/2000 |
| JP | 2001197297 A | * | 7/2001 |
| JP | 2001238075 A | * | 8/2001 |
| JP | 2002-077589 A | | 3/2002 |

* cited by examiner

FIG. 6

| | |
|---|---|
| OBJECT TYPE TO BE DRAWN BY COPY-FORGERY-INHIBITED PATTERN PRINT ( TEXT / IMAGE ) | ~2001 |
| INPUT FILE NAME ( WHEN IMAGE IS SELECTED ) FONT INFORMATION ( WHEN TEXT IS SELECTED ) | ~2002 |
| PRINT SEQUENCE OF COPY-FORGERY-INHIBITED PATTERN ( TRANSPARENT / OVERLAY ) | ~2003 |
| ANGLE INFORMATION OF DRAWN OBJECT | ~2004 |
| COLOR INFORMATION OF COPY-FORGERY-INHIBITED PATTERN | ~2005 |
| INFORMATION INDICATING WHETHER FOREGROUND AND BACKGROUND PATTERNS ARE REPLACED | ~2006 |
| PATTERN ADDITIVE INFORMATION OF CAMOUFLAGE IMAGE | ~2007 |
| DENSITY INFORMATION OF FOREGROUND PATTERN | ~2008 |
| DENSITY INFORMATION OF BACKGROUND PATTERN | ~2009 |

FIG. 8
(A)
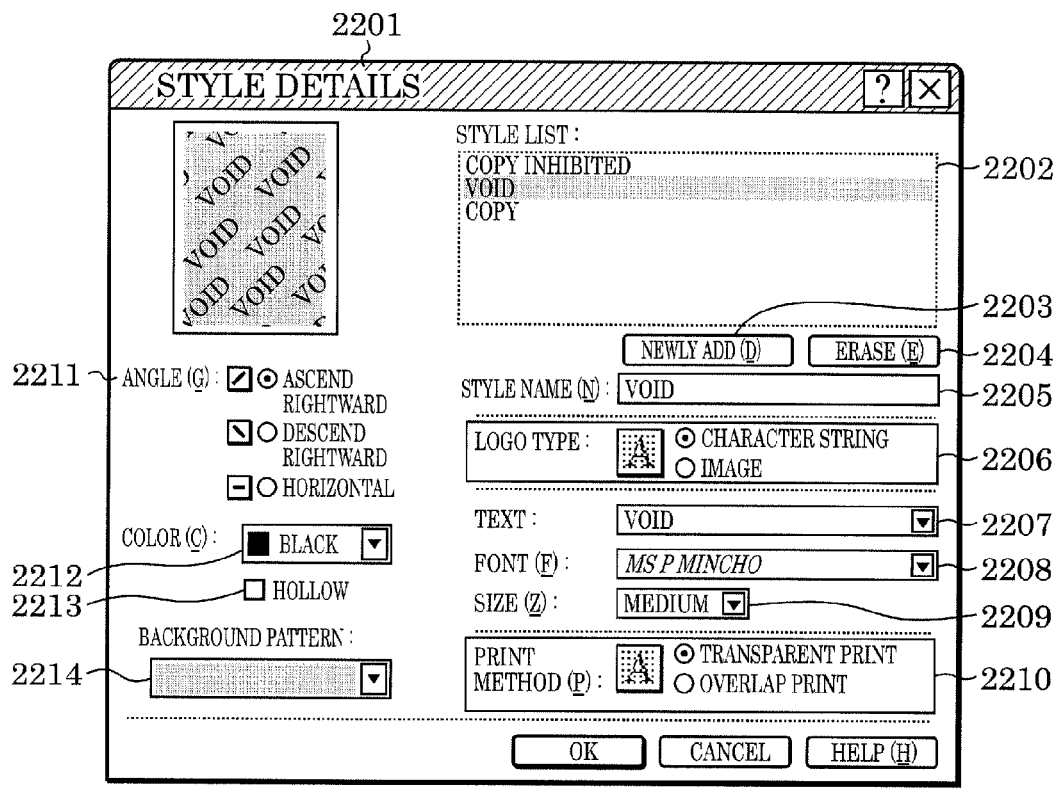
(B)
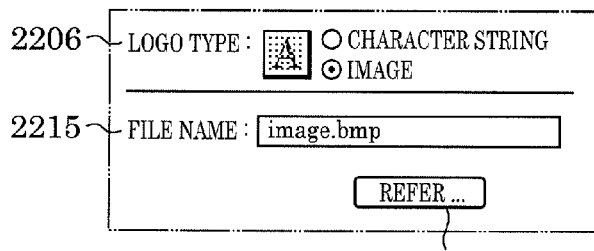

CONCENTRATED DOTS

DISTRIBUTED DOTS

FIG. 28
PRIOR ART
(A) 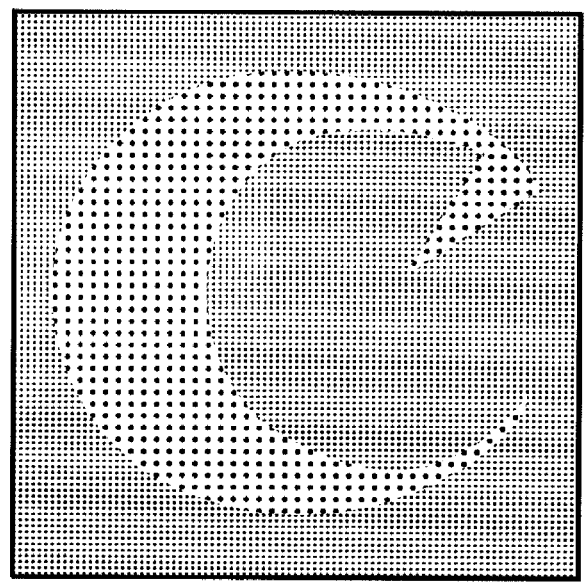
VISUALIZE
(B) 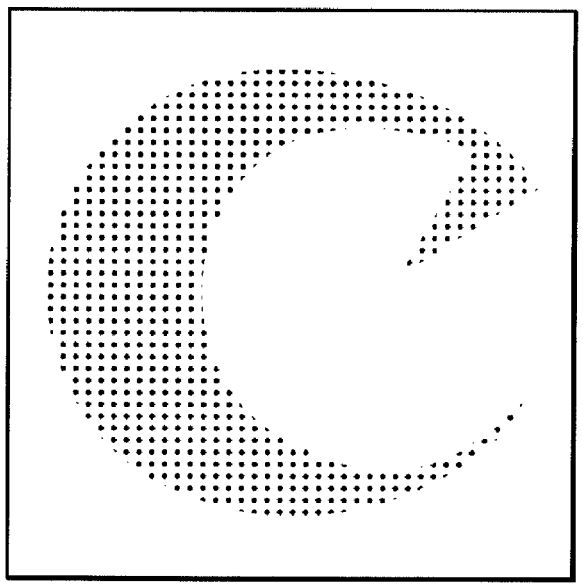

FIG. 29  PRIOR ART
(A) WITHOUT CAMOUFLAGE
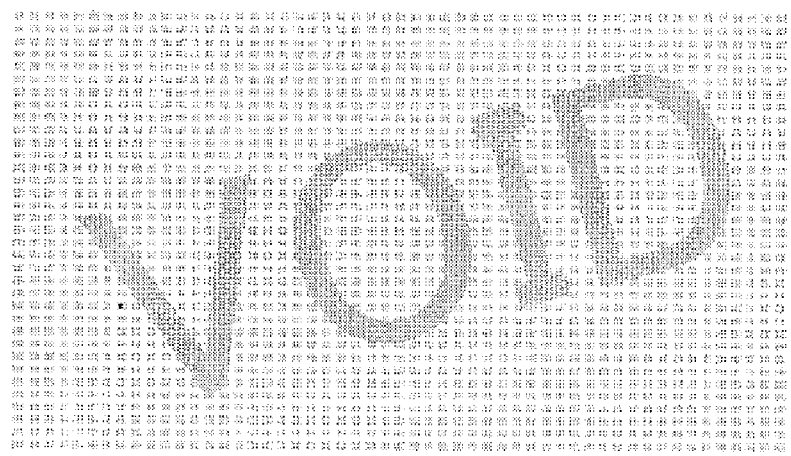
(B) WITH CAMOUFLAGE
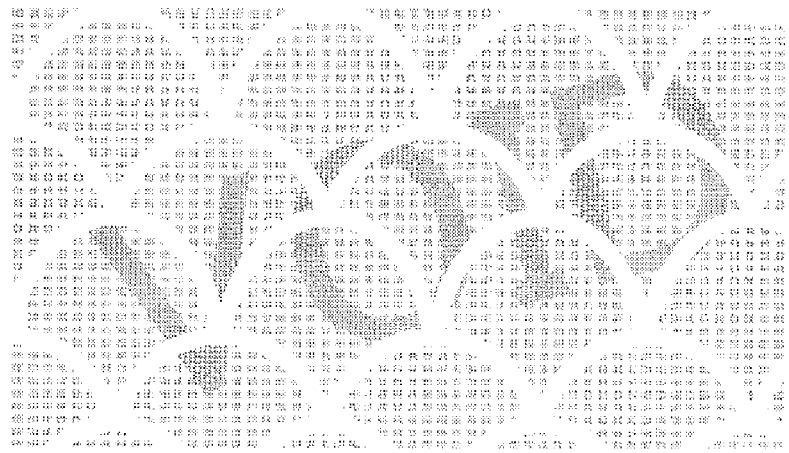

IMAGE PROCESSING APPARATUS AND IMAGE PROCESSING METHOD FOR DISTINGUISHING BETWEEN AN ORIGINAL PRINT PRODUCT AND A COPY OF THE PRINT PRODUCT

CROSS REFERENCE TO RELATED APPLICATIONS

This application is a continuation of application Ser. No. 10/959,873 filed on Oct. 6, 2004 now U.S. Pat. No. 7,149,451 which claims priority to Japanese Patent Application Nos. 2003-352978 and 2003-352979 filed Oct. 10, 2003 and Japanese Patent Application No. 2004-224783 filed Jul. 30, 2004, all of which are hereby incorporated by reference herein.

BACKGROUND OF THE INVENTION

1. Field of the Invention

The present invention relates to an image processing apparatus and an image processing method. More particularly, in a system comprising an image processing apparatus, e.g., a personal computer, and a printing device, e.g., a printer, the present invention relates to a process of previewing a copy-forgery-inhibited pattern image that is used to clearly distinguish a copy and an original from each other.

2. Description of the Related Art

Hitherto, sheets of paper including special prints made on them, called forgery-inhibited sheets, have been used for the purpose of prohibiting or inhibiting copying of specific sheets, resident cards and so on. The forgery-inhibited sheet prints on it a string of characters, e.g., "COPY", in such a way that the characters are hard to visually recognize in an original sheet, but they appear on a copied sheet when the original sheet is copied by a copier or the like. This enables a print sheet, as an original, to be easily visually discerned from a copy obtained by copying the original. The use of those forgery-inhibited sheets is effective in promoting hesitation about using of the copies. Also, there is a psychological checking effect of inhibiting an action of copying itself. The reason why a string of characters are made hard to visually recognize on an original forgery-inhibited sheet resides in enabling an original and a copy to be clearly distinguished from each other. If a character string, e.g., "COPY", is clearly visually discernable on the original, the original would be possibly recognized as a copy, and the effectiveness of forgery-inhibited sheets would be lost.

Wicker (U.S. Pat. No. 5,788,285) and Mowry et al. (U.S. Pat. No. 6,000,728) disclose techniques for use in producing the forgery-inhibited sheets.

However, because the forgery-inhibited sheets are produced by using special printing techniques, the sheet cost is higher than ordinary sheets. Another problem is that it is only possible to make only characters or the like appear after copying, which were set in production of the forgery-inhibited sheets. Accordingly, the range in use of the forgery-inhibited sheets and a character string set for printing on them is restricted. Stated another way, known forgery-inhibited sheets are poor in flexibility in use due to restrictions in production of the sheets.

On the other hand, with the progress of conversion of various contents into digital data, contents of specific sheets, resident cards, etc. are also converted into digital data. However, the digitization in handling of the digital data, i.e., in utilization of specific sheets, resident cards, etc., still remains in a transient stage. In practical use, therefore, contents of digital data prepared using computers are output onto sheets by, e.g., a printer in many cases.

Under such situations, due to recent drastic development of printer performance, attention is paid to the on-demand printing technique that employs a computer and a printer to print sheets having a similar effect to that of known forgery-inhibited sheets. Japanese Patent Laid-Open Nos. 2001-197297 and 2001-238075 disclose techniques for outputting an image, called a copy-forgery-inhibited pattern in a background of the contents data in superimposed relation when contents data prepared using a computer is output for printing by a printer. On an original (printed output from the printer), the copy-forgery-inhibited pattern image looks like a mere pattern or background when viewed by human eyes, but appears on a copy as predetermined characters, for example, when the original is copied. As a result, a similar checking effect to that of the forgery-inhibited sheets can be developed to check persons trying to copy the original.

When outputting a copy-forgery-inhibited pattern image prepared using a computer in superimposed relation, ordinary print sheets or the like are usable. Therefore, the cost performance is higher than the case using the forgery-inhibited sheets. Furthermore, the copy-forgery-inhibited pattern image can be formed at the same time as printing the contents. This feature realizes free setting of characters, etc. to be visualized when the original is copied. Still another advantage is that dynamic information, such as the name of a user having executed the printing and the output date, can also be allowed to appear as a string of characters.

As described above, when an original is copied, the copy-forgery-inhibited pattern is intended to visualize predetermined characters that were not discernable before the copying, in a copy, and to provide the effects of inhibiting the use of the copy and enabling the relevant sheet to be easily visually recognized as not an original, but a copy. To develop those effects, the copy-forgery-inhibited pattern image basically comprises two areas: (1) an area where, after copying, an image remains (appears) on a copy, and (2) an area where an image disappears on a copy or its density is reduced as compared with the image of the former area to such an extent that the image in the latter area is hard to recognize. These two areas have substantially the same density in the state as it is after printing. Looking at a print (original) from the macroscopic viewpoint, an observer cannot recognize that a character string, e.g., "COPY", to be visualized upon copying is concealed (buried). Looking it from the microscopic viewpoint, i.e., from a level of print dots, however, the two areas have different characteristics as described below.

For convenience of description, an image appearing after copying is referred to as a "latent image" hereinafter and an image disappearing or becoming paler after copying is referred to as a "background image" hereinafter. The copy-forgery-inhibited pattern image basically comprises the latent image and the background image. In some cases, the copy-forgery-inhibited pattern image further includes a camouflage image. The latent image is sometimes called a foreground image.

Copy-forgery-inhibited pattern printing is not limited to the above-described case, and is applicable so long as a character string (e.g., "COPY"), a logo, a pattern or the like appears (or is visualized) on a copy in a form recognizable by human eyes. In other words, the intent of the copy-forgery-inhibited pattern printing is achieved even when the character string, e.g., "COPY", appears on a copy in the form of hollow-space characters. In this case, the character string of "COPY" is formed as a background image.

In an electrophotographic or ink-jet dot printer, the area where an image remains on a copy (i.e., the latent-image area or the foreground-image area) is constituted by a set of concentrated dot masses. Also, the area where an image disappears on a copy or an image is reproduced at a lower density than that in the area where an image remains (i.e., the background-image area) is constituted by a set of distributed dots. Further, in the state of the copy-forgery-inhibited pattern image being printed, those two areas are formed substantially at the same density so that the density of the entire copy-forgery-inhibited pattern image is almost uniform.

FIG. 27 shows those two areas. As shown in FIG. 27, the copy-forgery-inhibited pattern image comprises the background-image area where dots are distributed and the latent-image area where dots are concentrated into masses. These two areas can be produced by using different types of halftone dot processes or different types of dither processes.

When a copy-forgery-inhibited pattern image is produced by the halftone dot process, the halftone dot process using a small number of lines is suitable for the latent-image area, and the halftone dot process using a large number of lines is suitable for the background-image area. When a copy-forgery-inhibited pattern image is produced by the dither process, the dither process using a dot-concentrated-type dither matrix is suitable for the latent-image area, and the dither process using a dot-distributed-type dither matrix is suitable for the background-image area.

Generally, a copier has a limit point in the reproducing performance that depends on an input resolution in reading minute dots of a document and an output resolution in reproducing the minute dots. When dots in the background-image area of the copy-forgery-inhibited pattern image are formed in a size smaller than the limit-point size at which dots are reproducible by the copier and dot masses in the latent-image area are formed in a size larger than the limit-point size, an image of large dot masses in the copy-forgery-inhibited pattern image is reproduced on a copy and upon copying, an image of small dots is not reproduced on the copy. As a result, a latent image is visualized on the copy. Even when the distributed small dots do not completely disappear after copying and form the image at a lower density after the copying than the image formed by the concentrated dot masses, the latent image can be noticeably recognized in a relative sense.

FIGS. 28A and 28B show visualization of a latent image. FIG. 28A represents a state that a copy-forgery-inhibited pattern image has been printed. FIG. 28B represents a copy obtained by copying a printed sheet of FIG. 28A by a copier. As seen in FIGS. 28A and 28B, after the copying, a latent image formed by a set of concentrated dot masses appears, but a background image formed by distributed dots disappears.

It is well known that the so-called "camouflage" technique is also applied to the process of forming a copy-forgery-inhibited pattern image for making it harder to recognize the presence of a latent image buried in an original. As used herein, "camouflage" refers to a technique for arranging a pattern with a density different from those of the latent-image area and the background-image area in an overlap relation to the copy-forgery-inhibited pattern image. In the copy-forgery-inhibited pattern image formed using the camouflage technique, a camouflage image with a density different from those of the latent-image area and the background-image area is more conspicuous in the original, while the latent image is less correspondingly noticeable in the original. The camouflage image has another effect of giving an additional aesthetic impression to a print.

FIG. 29A shows a copy-forgery-inhibited pattern image without a camouflage image. FIG. 29B shows a copy-forgery-inhibited pattern image with a camouflage image. When forming a camouflage image, dots constituting the camouflage image are desirably not reproduced on a copy so that a latent image visualized on the copy upon copying can be easily recognized. This point can be realized by forming the camouflage image as a hollow-space image, for example, as shown in FIG. 29B.

In printing of data, such as a document or an image, by a printing device, e.g., a printer, the print preview function is known to display an image, which is to be printed, on a screen for presentation to a user before actually printing the data on a sheet. With the print preview function, the user is able to check the printed image and to confirm a desired layout, etc. When data is printed along with a copy-forgery-inhibited pattern image, it is conceivable to similarly confirm based on the print preview function whether the copy-forgery-inhibited pattern image is correctly added to contents of a sheet that is to be output for printing.

In the print preview function, however, because the image to be output for printing is displayed on a screen of a display device, the print image is generally displayed in a size smaller than that actually printed on a print medium, such as a sheet of paper. This leads to difficulty in recognizing the preview display of the copy-forgery-inhibited pattern image. One reason causing such a difficulty is that the copy-forgery-inhibited pattern image is itself displayed in a small size. Further, for scaling-down of an image, the image is processed by a method accompanied with a partial loss of image information, such as data thinning-out. Therefore, another problem is that even when the copy-forgery-inhibited pattern image or a latent image and a background image thereof are separately displayed, it is not easy to visually confirm the images. In other words, because the copy-forgery-inhibited pattern image, i.e., the latent image and the background image (including a camouflage image as required), are inherently formed to make it harder to distinguish the latent image and the background image from each other, a difficulty in visually confirming the images with preview display may increases. These problems are described in more detail below.

Generally, the resolution of a display device is lower than the resolution of a printer or the reproduction resolution of a copier. Also, with the print preview function, the image to be printed is displayed on a screen of the display device in a smaller sheet display area, and the print image displayed in that smaller area has a lower resolution. For that reason, the copy-forgery-inhibited pattern image is displayed through a scaling-down process. This leads to the following problems. First, the background image formed by high-density minute dots and the latent image formed by low-density dot masses often have respective densities different from their original ones. Second, respective contours of the latent image and the background image are often deformed to some extent.

Known algorithms for the scaling-down process are based on simple thinning-out of pixels, the logical sum of nearby dots, the logical product of nearby dots, etc. FIG. 30 shows examples in which a copy-forgery-inhibited pattern (dot data) 3701 is scaled down to a ½ size in accordance with each of those three algorithms. A pattern 3702 shows a step in the course of scaling-down by the simple thinning-out. With this algorithm, in the case of ½ scaling-down, the original pattern 3701 is divided in units of a 2×2 small area, and a scaled-down image is formed by collecting only an upper left dot in each small area. A pattern 3703 represents a copy-forgery-inhibited pattern resulting after the ½ scaling-down by the simple thinning-out of dots.

A pattern 3704 shows a step in the course of scaling-down by the logical sum and the logical product of nearby dots. As with the simple thinning-out, in the case of ½ scaling-down, the original pattern 3701 is divided in units of a 2×2 small area surrounded by thick lines. Then, the logical sum or the logical product is computed for dots in each small area, thereby successively deciding each dot after scaling-down. The illustrated example represents the case in which the logical operation is executed based on the RGB expression. A pattern 3705 represents the result obtained after the ½ scaling-down of the pattern 3701 by the logical product algorithm, and a pattern 3706 represents the result obtained after the ½ scaling-down of the pattern 3701 by the logical sum algorithm.

As is apparent from those scaling-down results, the obtained patterns differ from the original pattern 3701 at a microscopic level corresponding to a dot array. Also, with the scaling-down based on the logical sum and logical product of nearby dots, the number of white or black areas is increased. Particularly, discrete dots as a feature of the copy-forgery-inhibited pattern are all lost with the scaling-down based on the logical product. Further, in the case of the simple thinning-out, large dots and small dots distinguishable from each other in the original copy-forgery-inhibited pattern 3701 are no longer distinguishable.

Stated another way, a change of the pattern and a change of the dot density at a microscopic level appear at a macroscopic level, at which the user views the image displayed on the display device, such that respective contours of the latent image and the background image are deformed and respective densities of both the images are changed.

Thus, when the copy-forgery-inhibited pattern image or the latent image and the background image thereof are displayed on a previewer as they are, it is difficult for the user to confirm whether printing is performed with a proper process of the copy-forgery-inhibited pattern.

Even when the display device has a high resolution and an image is displayed by simple scaling-down without the pixel reducing process, such as thinning-out, there is a problem. Specifically, because of the display area having a small size in itself, when the copy-forgery-inhibited pattern image or the latent image and the background image thereof are displayed on a previewer as they are, it is not easy to visually confirm those images that are inherently hard to discern.

SUMMARY OF THE INVENTION

According to an aspect of the present invention, there is provided an image processing apparatus for producing data of a copy-forgery-inhibited pattern image comprising a latent image and a background image. The apparatus includes: a display unit for displaying an image; and a display control unit for distinctively displaying images, on the display unit, in a first display state displaying the copy-forgery-inhibited pattern image and in a second display state in which a display mode of at least one of the latent image and the background image of the copy-forgery-inhibited pattern image differs from a display mode of the image in the first display state.

According to another aspect of the present invention, there is provided an image processing apparatus including: a data producing unit for producing print data including a copy-forgery-inhibited pattern image which indicates that, when a print having the print data printed thereon is copied, a copy obtained by copying the print differs from the print; a display unit for displaying the print data; and a control unit for controlling a display, on the display unit, of a print image in a state representing the print and a copy image in a state representing the copy.

According to still another aspect of the present invention, there is provided an image processing method for producing data of a copy-forgery-inhibited pattern image comprising a latent image and a background image, the method includes: displaying a first image, on the display screen, in a first display state displaying the copy-forgery-inhibited pattern image; and displaying a second image, on the display screen, in a second display state in which a display mode of at least one of the latent image and the background image of the copy-forgery-inhibited pattern image differs from a display mode of the first image in the first display state.

According to still another aspect of the present invention, there is provided an image processing method including: producing print data including a copy-forgery-inhibited pattern image which indicates that, when a print having the print data printed thereon is copied, a copy obtained by copying the print differs from the print; and displaying the print data as a display of a print image in a state of the print and a copy image in a state of the copy.

Further features and advantages of the present invention will become apparent from the following description of exemplary embodiments with reference to the attached drawings, in which like reference characters designate the same or similar parts throughout the figures thereof.

BRIEF DESCRIPTION OF THE DRAWINGS

FIG. 6 shows an example of a data format of copy-forgery-inhibited pattern image print information.

FIGS. 8A and 8B show an example of a dialog for editing individual detailed settings in copy-forgery-inhibited pattern printing.

FIGS. 28A and 28B are illustrations for showing visualization of the copy-forgery-inhibited pattern image.

FIGS. 29A and 29B are illustrations for showing camouflage in the copy-forgery-inhibited pattern image.

DESCRIPTION OF THE EMBODIMENTS

Embodiments of the present invention are described in detail below with reference to the drawings.

FIGS. 1 to 18 illustrate a system comprising an information processing apparatus according to one embodiment of the present invention which includes a host computer, and a printing device, e.g., a printer. FIGS. 1 to 18 illustrate not only a configuration of the system, which is related to a print process and creation of drawing data for a copy-forgery-inhibited pattern image, but also a configuration as a basis for explaining several display examples (described later) of the copy-forgery-inhibited pattern image according to the present invention. The system configuration, as a basis for displaying the copy-forgery-inhibited pattern image, is described next with reference to the drawings.

In this embodiment, an area where an image is visualized on a copy upon copying is called a latent-image area or a foreground-image area. Also, an area where an image disappears or becomes paler on a copy than the image in the latent-image area after copying is called a background-image area. Then, text information, such as "COPY" or "VOID", is input in the latent-image area. However, the copy-forgery-inhibited pattern image in the present invention is not limited to such a case, and the text information may be expressed (visualized) on a copy as hollow-space characters relative to a surrounding image. In this case, as a matter of course, the relationship between concentration and distribution of dots with respect to the latent-image area and the background-image area is reversed from the relationship in the case that the text information is displayed as solid characters instead of hollow-space characters. Also, the present invention is not restricted based on the type of the copy-forgery-inhibited pattern image, the process of producing it, color, shape and/or size of the image.

Configuration of Print System

Figure 1:
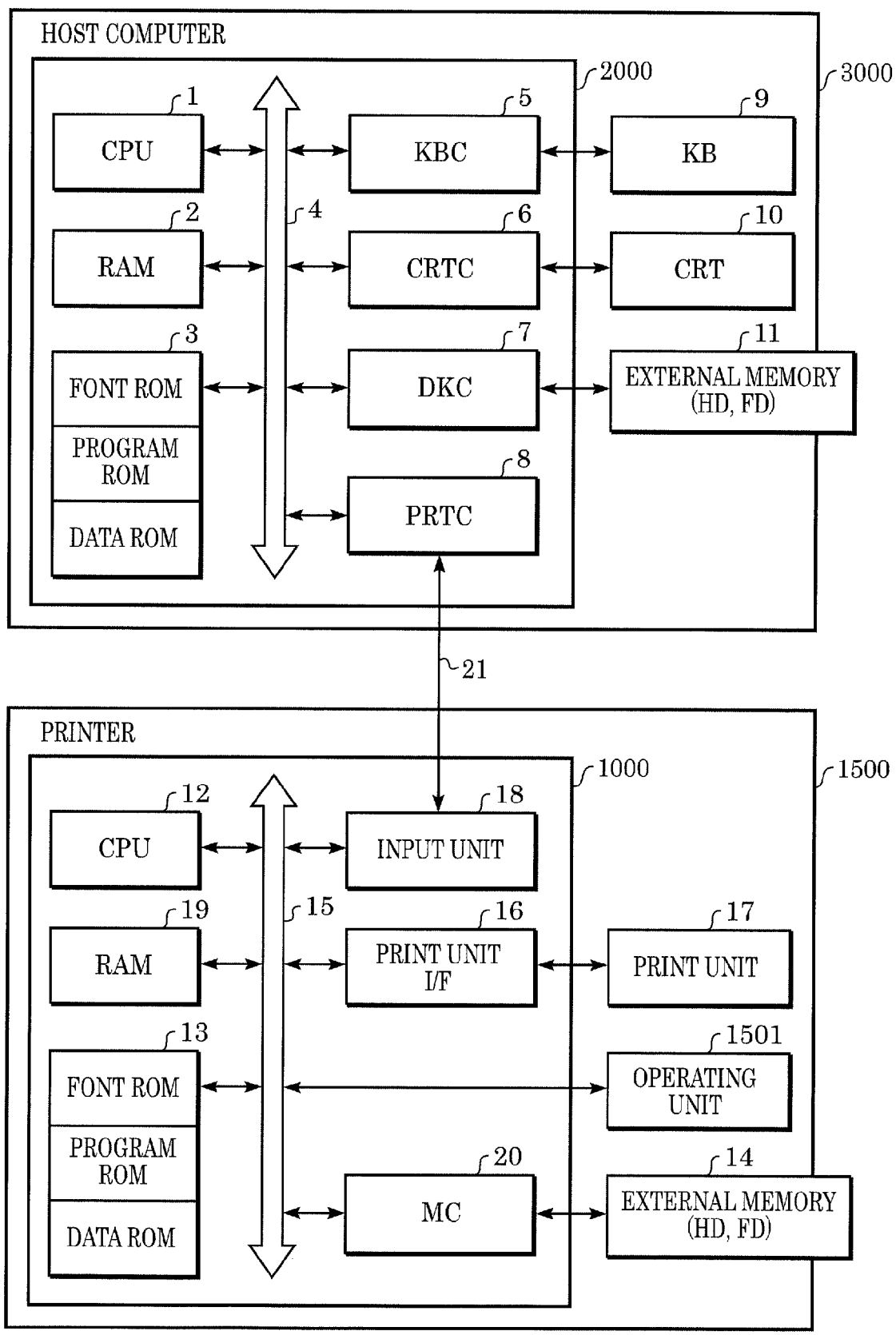
FIG. 1 is a block diagram of a print system according to one embodiment of the present invention.

FIG. 1 is a block diagram of a print system according to one embodiment of the present invention. The present invention is applicable to any type of print system that is constituted by a single unit or a plurality of units, or which executes processing under connection to an external unit via a network, such as a local area network (LAN) or wide area network (WAN).

Referring to FIG. 1, a host computer 3000 incorporates a central processing unit (CPU) 1 for controlling execution of a document process for processing documents in which figures, images, characters, tables (including spreadsheets), etc. are mixed, and a print process based on the result of the document process. The document process includes various types of processing related to various examples of the present invention described later. The CPU 1 supervises control of all devices connected to a system bus 4. The program ROM in the ROM 3 or the external memory 11 stores an operating system (OS) program, i.e., a control program for the CPU 1, etc. A font ROM in the ROM 3 or in the external memory 11 stores font data for use in the document process, etc. A data ROM in the ROM 3 or in the external memory 11 stores various data for use in the document process, etc. A random-access memory (RAM) 2 functions as a main memory, a work area, etc. for the CPU 1.

A keyboard controller (KBC) 5 controls key-inputs from a keyboard 9 or a pointing device (not shown). A cathode ray tube (CRT) controller (CRTC) 6 controls display of a CRT display (CRT) 10, including display of a copy-forgery-inhibited pattern image. A disk controller (DKC) 7 controls access to the external memory 11, such as a hard disk (HD), a floppy disk (FD) or the like, which stores a boot program, various applications, font data, a user file, an edit file, a printer control command producing program (hereinafter referred to as a "printer driver"), etc. A printer controller (PRTC) 8 is connected to a printer 1500 via a bi-directional interface (I/F) 21 and executes a communication control process with respect to the printer 1500.

In addition, the CPU 1 executes a process of developing (rasterizing) an outline font onto, e.g., a display information RAM set in the RAM 2, for realizing WYSIWYG (what you see is what you get) on the CRT 10. Also, the CPU 1 opens various registered windows in accordance with commands instructed from, e.g., a mouse cursor (not shown) on the CRT 10, and executes various types of data processing. When starting to execute printing, a user opens a window for print setting and sets a print process method for the printer driver, including printer setting and selection of the print mode.

The printer 1500 is controlled by a CPU 12 incorporated therein. The printer CPU 12 outputs an image signal, as print output information, to a print unit (printer engine) 17 via a print unit interface 16, which is connected to a system bus 15, in accordance with a control program, etc. stored in a program ROM in a ROM 13 or an external memory 14. The program ROM in the ROM 13 also stores a control program for the CPU 12, etc. A font ROM in the ROM 13 stores font data for use in producing the print output information, etc. In the case of a printer that does not include external memory 11, such as a hard disk, a data ROM in the ROM 13 stores information for use in the host computer, etc.

The CPU 12 is able to communicate with the host computer 3000 via an input unit 18, and therefore to notify the host computer 3000 of information in the printer, etc. A RAM 19 functions as a main memory, a work area, etc. for the CPU 12. The memory capacity of the RAM 19 is extensible with an option RAM connected to an add-on port (not shown). The RAM 19 is used as, for example, an output information development area, an environment data storage area, and a non-volatile random-access memory (NVRAM). Access to the external memory 14, such as a hard disk (HD) or an integrated circuit (IC) card, is controlled by a memory controller (MC) 20. The external memory 14 is connected as an option and stores font data, an emulation program, form data, etc. An operating unit 1501 serves as a control panel on which switches, light emitting diode (LED) indicators, etc. are provided for input operation.

The external memory 14 may be provided in plural instead of being one so that a plurality of options, such as an option card for supplemental addition to built-in font and an external memory storing a program for interpreting printer control languages of different language systems, can be connected to the printer. Further, a not-shown NVRAM may be added to store printer mode setting information input from the control panel 1501.

A print unit 17 includes an electrophotographic engine in this embodiment. Therefore, a print image and an accompanying copy-forgery-inhibited pattern image are expressed by toner dots formed in accordance with print data of those images. The printing method used in the present invention is not limited to the electrophotographic type, and the present invention is also applicable to any type of printing device in which an image is printed with formation of dots, e.g., the ink jet type.

Figure 2:
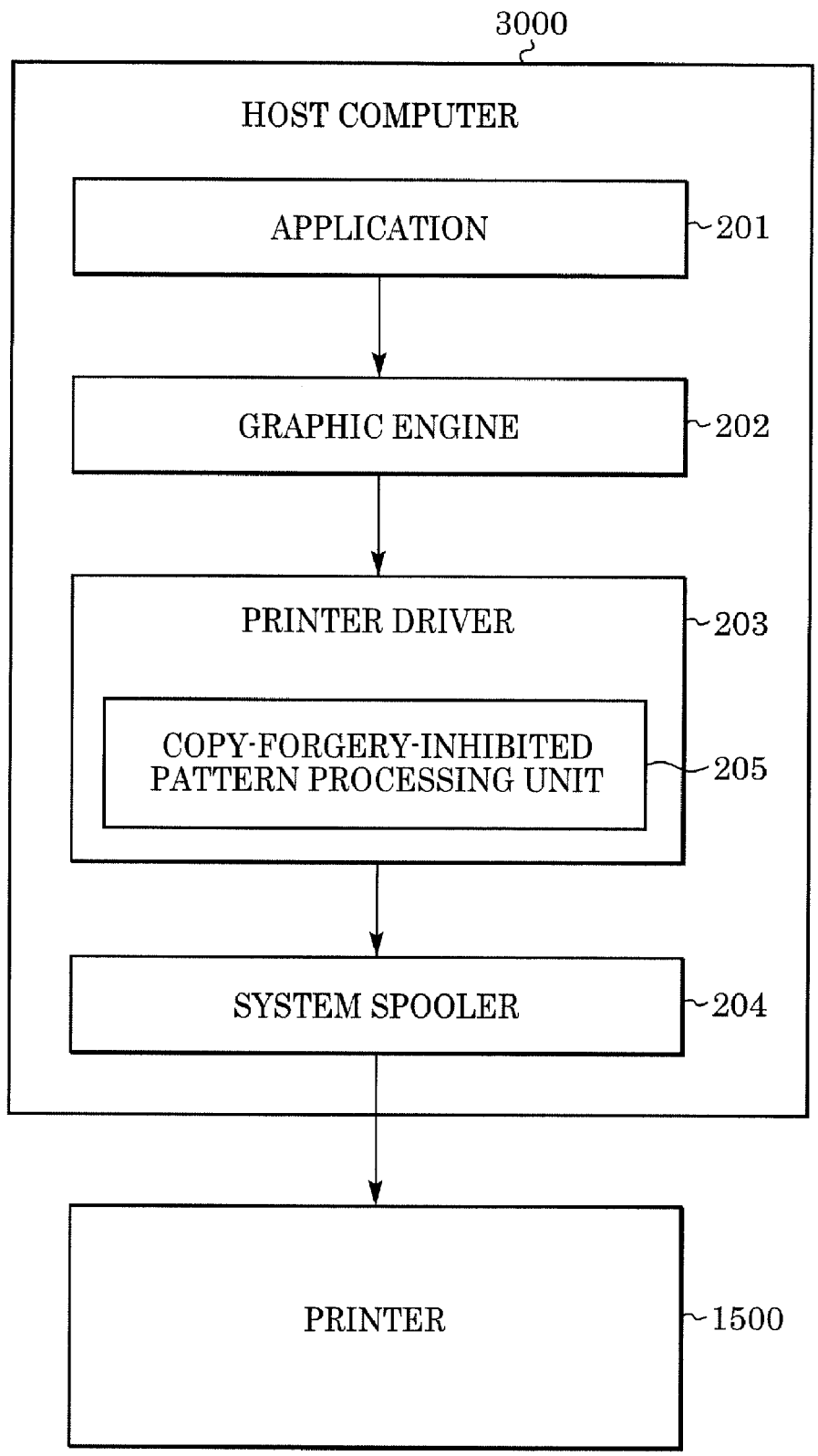
FIG. 2 is a block diagram showing one configuration of a print process executed by a host computer shown in FIG. 1.

FIG. 2 is a block diagram showing one configuration of a print process executed by the host computer 3000 shown in FIG. 1. An application 201, a graphic engine 202, a printer driver 203, and a system spooler 204 are each a program module that is present as a file in the external memory 11 and is loaded into the RAM 2 for execution by the OS or a module utilizing the relevant program module when executed. The application 201 and the printer driver 203 can also be stored in an HD in the external memory 11 from an FD or some other removable media, such as a compact disk-read-only memory (CD-ROM) (not shown) in the external memory 11 or via a network (not shown). The application 201 stored in the external memory 11 is loaded into the RAM 2 for execution. When printing is performed on the printer 1500 from the application 201, print data is output (drawn or rendered) using the graphic engine 202 which is similarly loaded into the RAM 2 and held in an executable state.

The graphic engine 202 loads the printer driver 203, which is prepared for each printing device, such as a printer, into the RAM 2 from the external memory 11, and sets an output of the application 201 in the printer driver 203. Then, the graphic engine 202 converts GDI (Graphic Device Interface) functions received from the application 201 into DDI (Device Driver Interface) functions, and outputs the DDI functions to the printer driver 203. In accordance with the DDI functions received from the graphic engine 202, the printer driver 203 performs conversion into control commands, e.g., PDL (Page Description Language), recognizable by the printer. The converted printer control commands are output, as print data, to the printer 1500 via the interface 21 through the system spooler 204 loaded in the RAM 2 under control of the OS.

The print system in this embodiment includes a copy-forgery-inhibited pattern processing unit 205 in the printer driver 203. The copy-forgery-inhibited pattern processing unit 205 may be a built-in module in the printer driver 203, or a library module added by separate installation. In printing of a copy-forgery-inhibited pattern image, the printer driver 203 executes processes (described later), such as creation of the copy-forgery-inhibited pattern image, with the aid of the copy-forgery-inhibited pattern processing unit 205.

Software Modules Related to Printing

Figure 3:
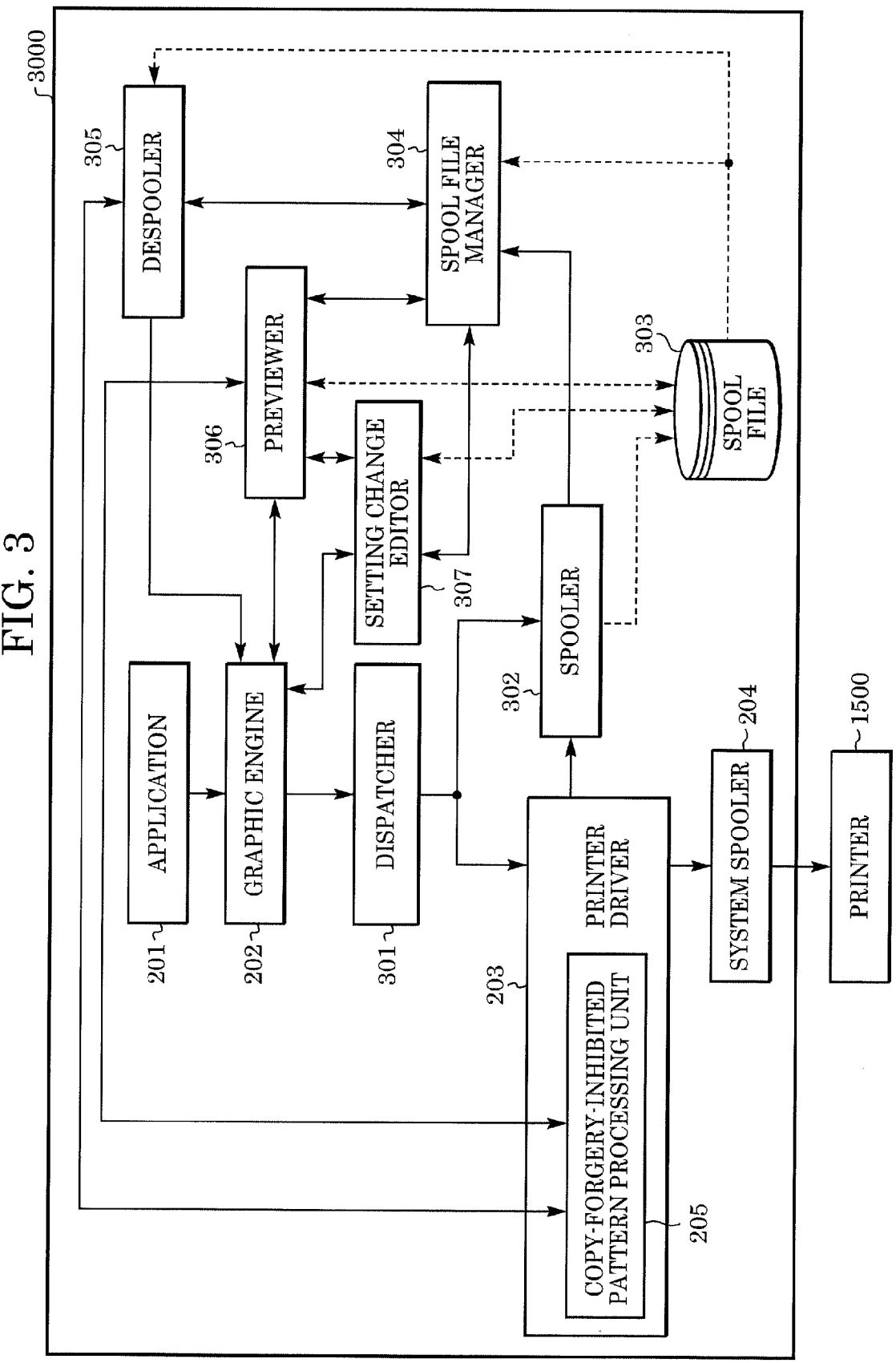
FIG. 3 is a block diagram showing another configuration of the print process executed by the host computer, which is an extended one of the configuration shown in FIG. 2.
Figure 4:
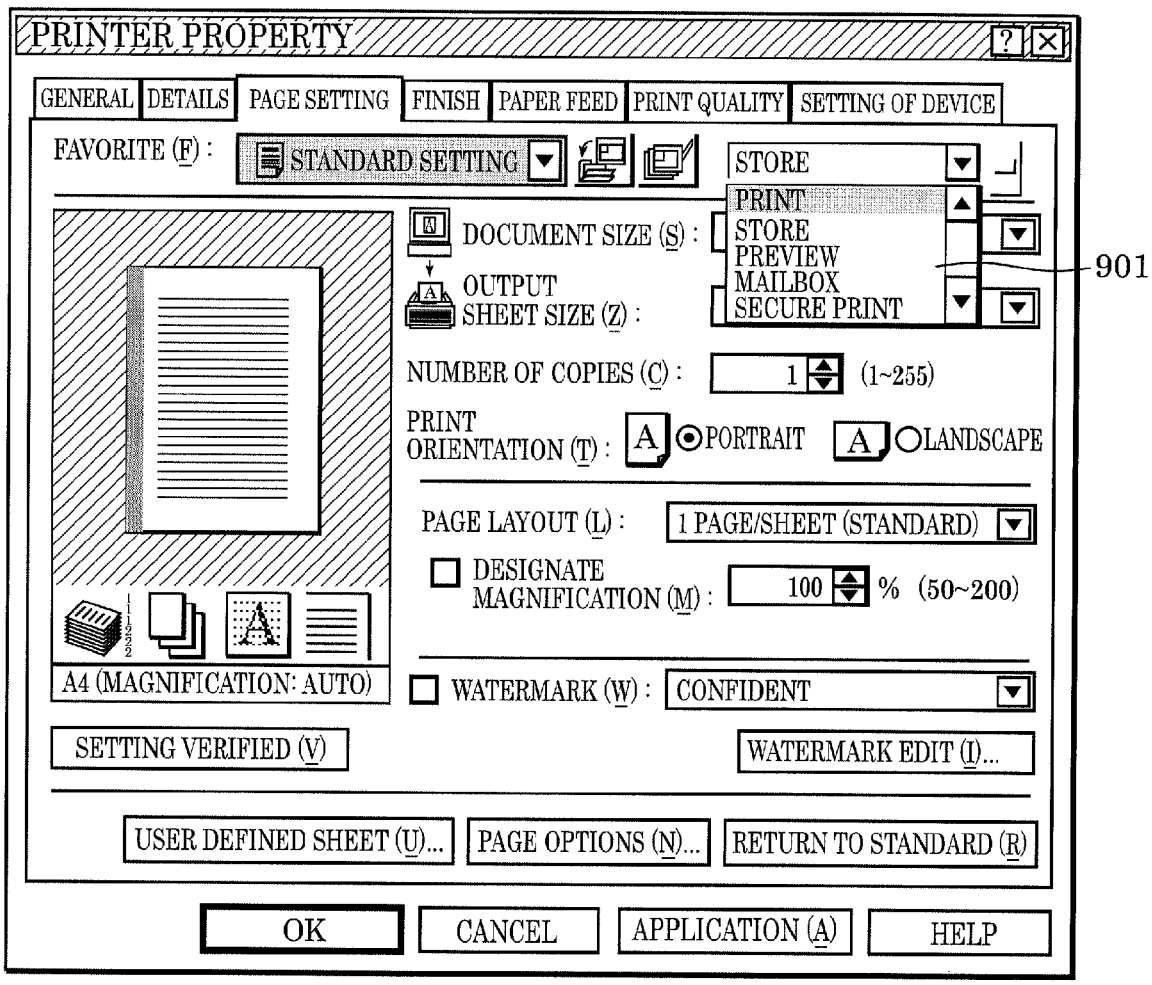
FIG. 4 shows an example of a print setting screen.

FIG. 3 is a block diagram showing another configuration of the print process executed by the host computer 3000, which is an extended one of the configuration shown in FIG. 2. In this configuration, when print commands are sent from the graphic engine 202 to the printer driver 203, a spool file 303 made up of intermediate code is temporarily produced. In the configuration of FIG. 2, the application 201 is released from the print process at the time when the printer driver 203 has completely converted all print commands from the graphic engine 202 into printer control commands. On the other hand, in the configuration of FIG. 3, the application 201 is released from the print process at the time when a spooler 302 has completely converted all print commands into intermediate code data and has output it to the spool file 303. Usually, the latter process is finished in a shorter time. Furthermore, the configuration of FIG. 3 enables the contents of the spool file 303 to be processed. It is therefore possible to execute the functions not included in the application, such as scaling-up/down and printing of plural pages scaled down into one page, for the print data from the application. To that end, the system configuration of FIG. 3 is extended from that of FIG. 2 so as to realize the spool function with the aid of intermediate code data. Incidentally, when the print data is processed, it is usual that print setting is made on a window presented by the printer driver 203, and the printer driver 203 holds the contents of the print setting in the RAM 2 or the external memory 11.

The configuration of FIG. 3 is described in more detail below. In this extended process, as shown in FIG. 3, a dispatcher 301 receives DDI functions, i.e., print commands, from the graphic engine 202. When the print commands (DDI functions) received by the dispatcher 301 from the graphic engine 202 are based on print commands (GDI functions) issued from the application 201 to the graphic engine 202, the dispatcher 301 loads the spooler 302, which is stored in the external memory 11, into the RAM 2 and sends the print commands (DDI functions) to the spooler 302 instead of the printer driver 203.

The spooler 302 analyzes the received print commands and converts them into intermediate code data per page, which is output to the spool file 303. The spool file of the intermediate code data stored per page is called a page description file (PDF). Also, the spooler 302 obtains, from the printer driver 203, process setting (such as Nup, double-sided, staple, and color/monochrome designation) which are set for the printer driver 203, and it stores them in the spool file 303 as a file per job. This setting file stored per job is called a job setting file (or Spool Description File (SDF)). The job setting file is described in more detail later. While the spool file 303 described above is produced as a file in the external memory 11, it may be produced in the RAM 2. Further, the spooler 302 loads a spool file manager 304, which is stored in the external memory 11, into the RAM 2 and notifies the spool file manager 304 of a status in creation of the spool file 303. Then, the spool file manager 304 determines whether printing can be performed in accordance with the contents of the process setting for the print data stored in the spool file 303.

When the spool file manager 304 determines that the printing can be performed by employing the graphic engine 202, it loads a despooler 305, which is stored in the external memory 11, into the RAM 2 and instructs the despooler 305 to start a print process of the page description file of intermediate code data described in the spool file 303.

The despooler 305 processes the page description file of intermediate code data, which is described in the spool file 303, in accordance with the job setting file containing the process setting information, which is included in the spool file 303, in order to reproduce the GDI functions. The reproduced GDI functions are output again via the graphic engine 202. On that occasion, for the copy-forgery-inhibited pattern image, the copy-forgery-inhibited pattern processing unit 205 is loaded to execute a process of producing the copy-forgery-inhibited pattern image.

When the print commands (DDI functions) received by the dispatcher 301 from the graphic engine 202 are based on print commands (GDI functions) issued from the despooler 305 to the graphic engine 202, the dispatcher 301 sends the print commands to the printer driver 203 instead of the spooler 302. In accordance with the DDI functions obtained from the graphic engine 202, the printer driver 203 produces printer control commands in the page description language, etc. and outputs them to the printer 1500 via a system spooler 204.

In the example shown in FIG. 3, in addition to the above-described extended system, a previewer 306 and a setting change editor 307 are provided to perform the print preview including preview of the copy-forgery-inhibited pattern image, change of the print setting, and joining of plural jobs. In order to perform the print preview, change of the print setting, and joining of plural jobs, the user first designates, in a screen of printer driver property, such as the one shown in FIG. 4, "store" in a pull-down menu 901 that is a means for "designating output destination". When the user wants to look only at the preview, "preview" may be selected as designation of the output destination.

Thus, the contents set in the printer driver property are stored as a setting file in a structure provided by the OS, for example, the structure is called DEVMODE in the Windows® OS. The process setting contained in the spool file 303, which is stored in the structure, includes, e.g., setting indicating whether "store" is made in the spool file manager 304. The spool file manager 304 reads the process setting via the printer driver. If "store" is designated, the page description file and the job setting file are produced and stored in the spool file 303 as described above. Then, a window screen of the spool file manager 304 is popped up and the jobs spooled in the spool file 303 are displayed as a list.

When preview of a single job or a joint job is designated on the window screen of the spool file manager 304, the spool file manager 304 loads the previewer 306, which is stored in the external memory 11, into the RAM 2 and instructs the previewer 306 to execute a preview process for the job of intermediate code, which is described in the spool file 303.

Previewer

The previewer 306 successively reads a page description file (PDF) of intermediate code, which is described in the spool file 303. Then, the previewer 306 processes the read file in accordance with the contents of the process setting information contained in the job setting file (SDF), which is stored in the spool file 303. Further, the previewer 306 outputs GDI functions to the graphic engine 202, and the graphic engine 202 outputs drawing data to its own client area, thus resulting in a state capable of outputting the data on the screen.

The graphic engine 202 is able to execute proper rendering depending on the designated output destination. As with the despooler 305, the previewer 306 can realize the preview process by a method of processing the intermediate code included in the spool file 303 in accordance with the contents of the process setting information included in the spool file 303, and outputting the processed data by utilizing the graphic engine 202. Thus, the process setting information set by the print driver is stored as the job setting file in the spool file 303, and data of the page description file is processed and output in accordance with the job setting file. As a result, the print preview close to the image output by the printer can be provided to the user depending on not only how actual drawing data is to be printed, but also the case that Nup print (in which N logical pages are printed at scaling-down into one physical page) is designated, the case that double-sided print is designated, the case that binding print is designated, and the case that stamp is designated. In contrast, because the preview function provided in ordinary application software for producing, e.g., a document, draws an image in accordance with only the page setting made in the relevant application, the print setting set by the printer driver is not reflected and hence the user cannot recognize a preview that is actually output for printing.

Figure 5:
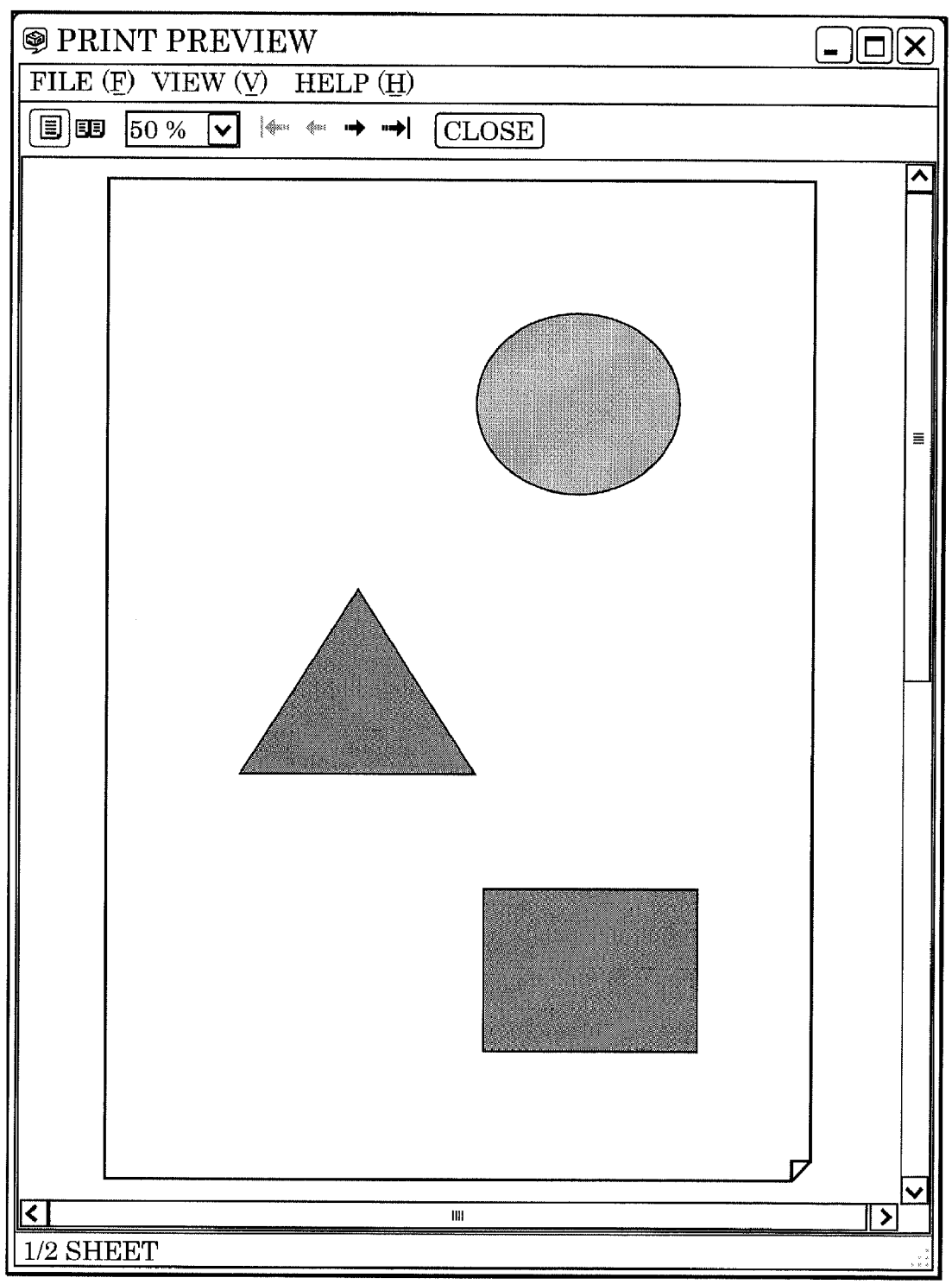
FIG. 5 shows an example of a preview screen displayed by a print previewer.

By executing the preview process as described above, a preview image reflecting the print process setting included in the spool file 303 is displayed on the screen by the previewer 306. FIG. 5 shows an example of a preview screen displayed by the previewer 306. When the user prints the image in accordance with the contents displayed by the previewer 306, a print command is issued by instructing "print" or "save and print" on the spool file manager 304. In response to the print command, as described above, the despooler 305 processes the page description file in accordance with the job setting file so as to produce GDI functions, which are sent to the graphic engine 202. Then, print commands are sent to the printer driver 203 via the dispatcher 301 and printing is executed.

Preview display related to printing of the copy-forgery-inhibited pattern image according to this embodiment of the present invention is described in detail below.

Description of Copy-Forgery-Inhibited Pattern Image Producing Process

Figure 7:
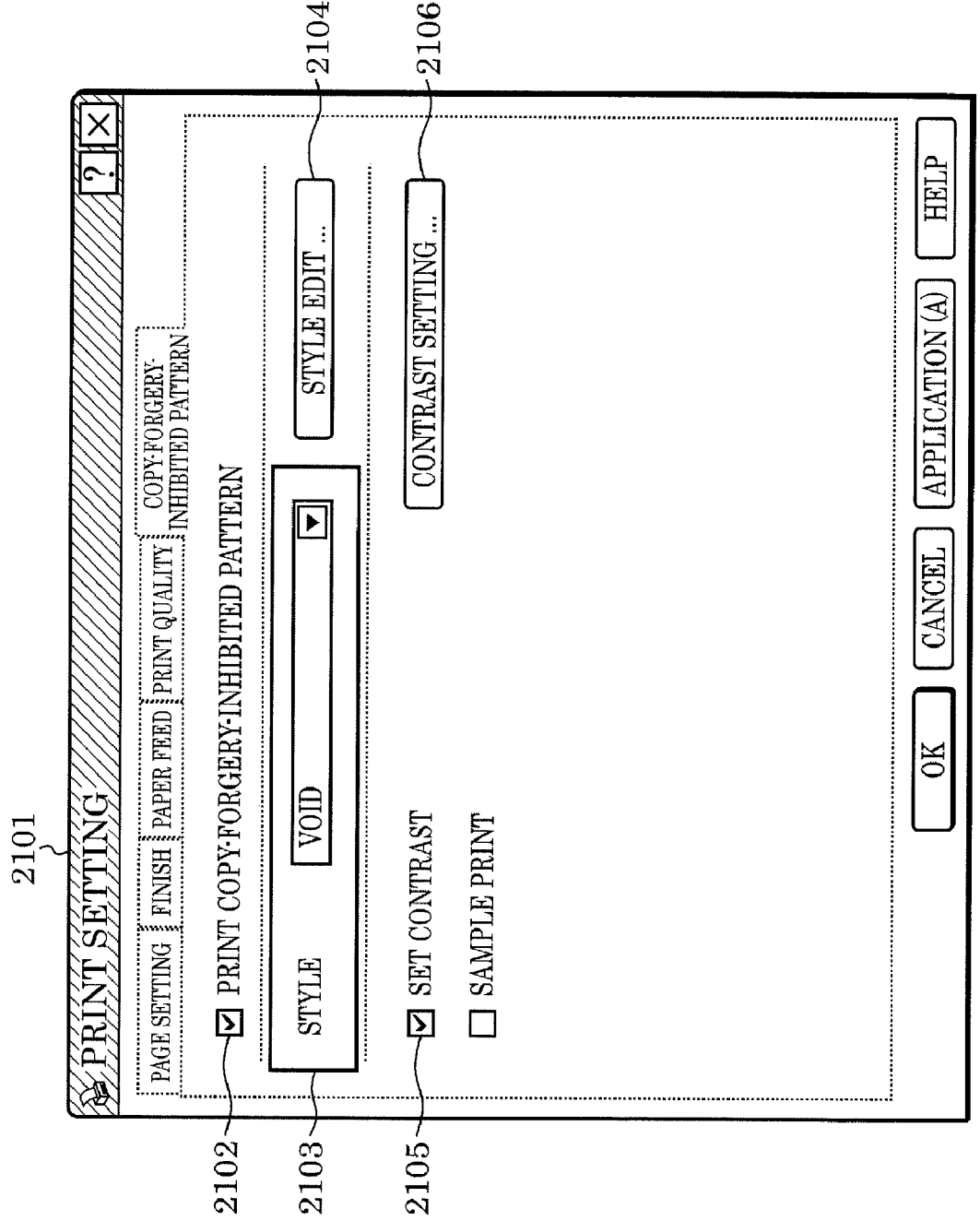
FIG. 7 shows an example of a setting screen of the copy-forgery-inhibited print function.

FIGS. 7 and 8 show examples of a user interface for selecting settings related to the copy-forgery-inhibited pattern image producing process.

FIG. 7 shows an example of an initial screen of the user interface for the copy-forgery-inhibited pattern printing, the interface being prepared in the printer driver 203. In this example, a property sheet 2101 in a dialog (box) can be used for setting the copy-forgery-inhibited pattern printing.

A check box 2102 is used for designating, with respect to the print job, whether the copy-forgery-inhibited pattern printing (i.e., printing including the copy-forgery-inhibited pattern image) is performed. Style information 2103 is selected for enabling plural items of setting information for the copy-forgery-inhibited pattern printing to be designated by one identifier (style). The print driver 203 is able to select any one among a plurality of styles, and the relationship between each style and copy-forgery-inhibited pattern print information shown in FIG. 6 is registered in a registry. Also, when a button 2104 is depressed, a style edit dialog 2201 shown in FIG. 8A is displayed. A check box 2105 is used for adjusting foreground and background contrasts in the copy-forgery-inhibited pattern printing. When a button 2106 is depressed, a contrast setting screen (not shown) is displayed.

FIG. 8A shows an example of a dialog for editing individual detailed settings in the copy-forgery-inhibited pattern printing.

FIG. 8A shows a dialog 2201 for editing copy-forgery-inhibited pattern information. In an area of this dialog, a result of the copy-forgery-inhibited pattern image produced based on individual items of the copy-forgery-inhibited pattern information is displayed for the purpose of preview. An area including a list of styles 2202 selectable in 2103 of FIG. 7 is displayed. Any desired style can be newly added or erased by using buttons 2203 and 2204, respectively. An area displaying the current style name 2205 is displayed.

A radio button area 2206 is provided for selecting the type of a drawing object used in the copy-forgery-inhibited pattern printing. When a button "character string" is selected (in the radio button area 2206), a text object is used, and when a button "image" is selected (in the radio button area 2206), an image data represented by, e.g., BMP, is used. Since "character string" is selected in FIG. 8A, setting information regarding the text object is displayed in the dialog 2201. This information includes selection of text 2207, font 2208 and size 2209. On the other hand, when "image" is selected in the radio button area 2206, the selection fields for text 2207, font 2208 and size 2209 are not displayed, but, as shown in FIG. 8B, an image file name field 2215 and a button 2216 for displaying a file selection dialog (not shown) are displayed instead.

An area 2207 for displaying and editing a character string used as the copy-forgery-inhibited pattern image and an area 2208 for displaying and editing font information of the character string are provided. While this embodiment employs a screen for selecting only the font name, the screen may be extended to be capable of selecting font family information (such as bold and italic), decorative character information, etc. An area 2209 for displaying and setting a font size of the character string used as the copy-forgery-inhibited pattern image is also provided. While this embodiment assumes that designating the font size is one of three sizes, i.e., "large", "medium" and "small", any other general font-size designating method, e.g., a method of directly entering a point number, may be used instead. A radio button area 2210 is provided for setting a sequence in which the copy-forgery-inhibited pattern image and the document data are combined with each other. When a button "transparent print" is selected, the copy-forgery-inhibited pattern image is first developed and the document data is then written over it in the actual image combining step. When a button "overlap print" is selected, the document data is first developed and the copy-forgery-inhibited pattern image is then written over it in the actual image combining step. A radio button area 2211 is provided for designating an angle at which the input character string is arranged. While three arrangements, i.e., "ascend rightward", "descend rightward" and "horizontal", are selectable in this embodiment, the angle designating method may be extended such that a numeral entry area is provided to be capable of designating any angle, or that a slider bar or the like is provided to be capable of designating a desired angle in an intuitive way. An area 2212 for displaying and designating a color used as the copy-forgery-inhibited pattern image is provided. A check box 2213 for replacing a foreground pattern and a background pattern is provided. Depending on this check box 2213, printing is controlled such that when the check box is not checked, the foreground pattern appears after copying, and when it is checked, the background pattern appears after copying. An area 2214 is provided for designating a camouflage image that makes it harder to recognize the character string, etc. buried in the copy-forgery-inhibited pattern image. The camouflage image is selectable from among a plurality of patterns. An option not employing the camouflage image is also provided.

Data Format of Copy-Forgery-Inhibited Pattern Print Setting Information

The copy-forgery-inhibited pattern print setting information, mentioned above with reference to FIG. 8, is described below with reference to FIG. 6.

The copy-forgery-inhibited pattern print setting information is held as a part of a job output setting file holding information therein constituting a physical page that has been produced by the spool file manager 304 and brought into a printable state.

Referring to FIG. 6, a field 2001 stores a value that is designated in the area 2206 of FIG. 8A and indicates an object type (text format or image) to be drawn by the copy-forgery-inhibited pattern printing. A field 2002 stores the setting information for the drawing object designated by the information in the field 2001 based on the setting information designated in the areas 2207 to 2209 in FIG. 8A or the area in FIG. 8B. When text is selected, the field 2002 stores the character string, the font name, and the size information. When image is selected, the field 2002 stores the location of an image file to be input. Based on information designated in area 2210 of FIG. 8A, a field 2003 stores the information indicating, for the document data, whether the copy-forgery-inhibited pattern printing is printed first or later (i.e., print sequence). A field 2004 stores the information regarding the angle at which the drawing object is oriented based on the angle information designated in the area 2211 of FIG. 8A. A field 2005 stores the information regarding the color used in the copy-forgery-inhibited pattern image based on the color information designated in the area 2212 of FIG. 8A. A field 2006 stores the information indicating whether the foreground pattern and the background pattern are replaced based on information designated in the check box 2213 of FIG. 8A. A field 2007 stores the pattern additive information for a camouflage image based on information designated in the area 2214 of FIG. 8A. A field 2008 stores the density information of the foreground pattern. A field 2009 stores the density information of the background pattern.

Process of Producing Print Data Added with Copy-Forgery-Inhibited Pattern Image

Figure 9:
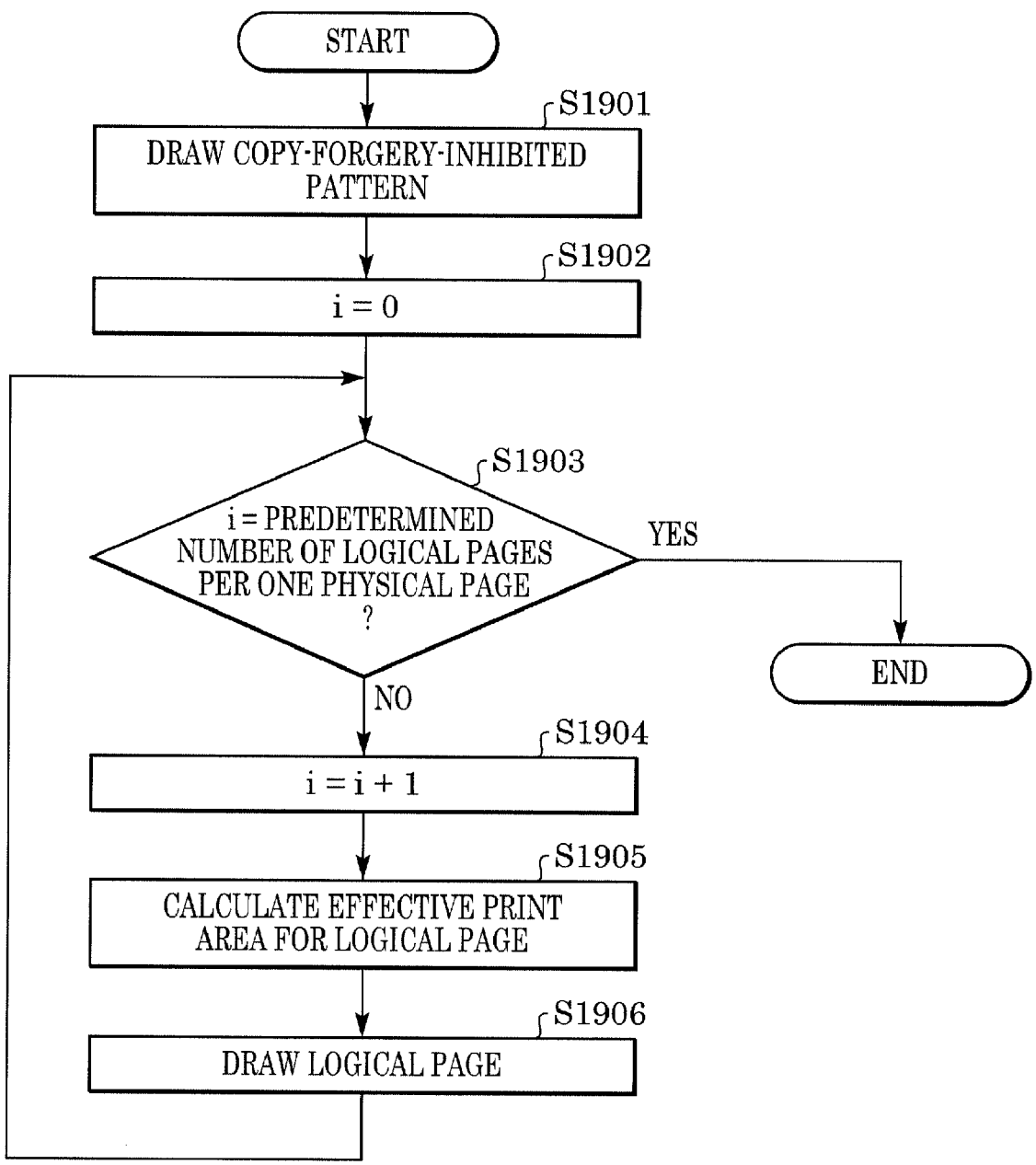
FIG. 9 is a flowchart showing an example of a copy-forgery-inhibited pattern image producing process.
Figure 10:
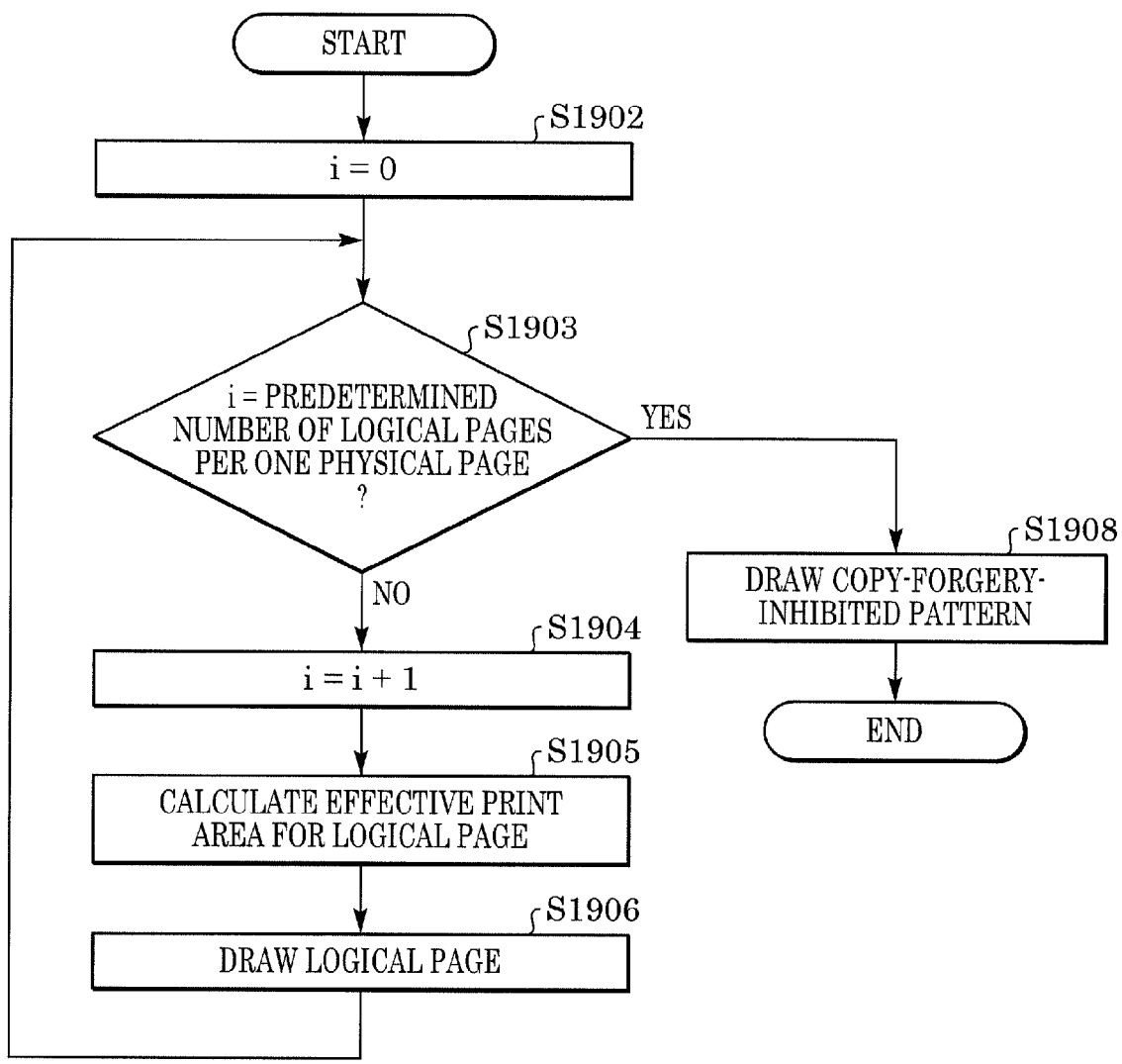
FIG. 10 is a flowchart showing another example of a copy-forgery-inhibited pattern image producing process.

FIGS. 9 and 10 are each a flowchart showing a flow of the print data producing process in the copy-forgery-inhibited pattern printing, and corresponding respectively to "transparent print" and "overlap print" described above with reference to FIG. 8A.

FIGS. 9 and 10 represent the process of producing the print data transmitted to the printer. In this embodiment, the process of combining the document data and the copy-forgery-inhibited pattern image data with each other is not executed at this stage. When producing a preview image, a combined image is formed on the host computer unlike the following process of producing the print data.

First, "transparent print", i.e., the case of drawing first the copy-forgery-inhibited pattern image, is described with reference to the flowchart of FIG. 9. In step S1901, the copy-forgery-inhibited pattern image is drawn in accordance with the information, shown in FIG. 6, regarding the copy-forgery-inhibited pattern. A detailed process of this step is described later with reference to FIG. 11. Then, a drawing (rendering) process for the document data is executed. In step S1902, a counter is initialized. In step S1903, it is determined whether the counter indicates the preset number of logical pages per one physical page. If the counter value is equal to the preset number of logical pages, the process of FIG. 9 ends. If the counter value is not equal to the preset number of logical pages in step S1903, the control flow proceeds to step S1904 where the counter is incremented by one. Next, in step S1905, an effective print area for the logical page to be drawn is calculated based on both the number of logical pages per one physical page and the counter value. In step S1906, the current logical page number is read from the physical page information with the counter value being an index, and the relevant logical page is drawn while it is scaled down so as to fall within the effective print area. When the Nup print is not designated, scaling-down of the logical page is not required. Processing then returns to step S1903. Processing is repeated until the counter value is equal to the preset number of logical pages.

Next, "overlap print", i.e., the case of drawing the copy-forgery-inhibited pattern image after drawing the document data, is described with reference to the flowchart of FIG. 10.

In step S1902, the counter is initialized. Then, it is determined in step S1903 whether the counter indicates the preset number of logical pages per one physical page. If the counter value is equal to the preset number of logical pages, processing proceeds to step S1908, and if not, processing proceeds to step S1904. In step S1904, the counter is incremented by one. In step S1905, an effective print area for the logical page to be drawn is calculated based on both the number of logical pages per one physical page and the counter value. In step S1906, the current logical page number is read from the physical page information with the counter value being an index, and the relevant logical page is drawn while it is scaled down so as to fall within the effective print area. When the Nup print is not designated, scaling-down of the logical page is not required. After the print data corresponding to the predetermined number of logical pages for one physical page has been completely produced (yes in step S1903), processing proceeds to step S1908. In step S1908, the copy-forgery-inhibited pattern image is drawn in the effective print area of the physical page obtained from the application in accordance with the information, shown in FIG. 6, regarding the copy-forgery-inhibited pattern. A detailed process of this step is described later with reference to FIG. 11. Processing of FIG. 10 then ends.

Figure 11:
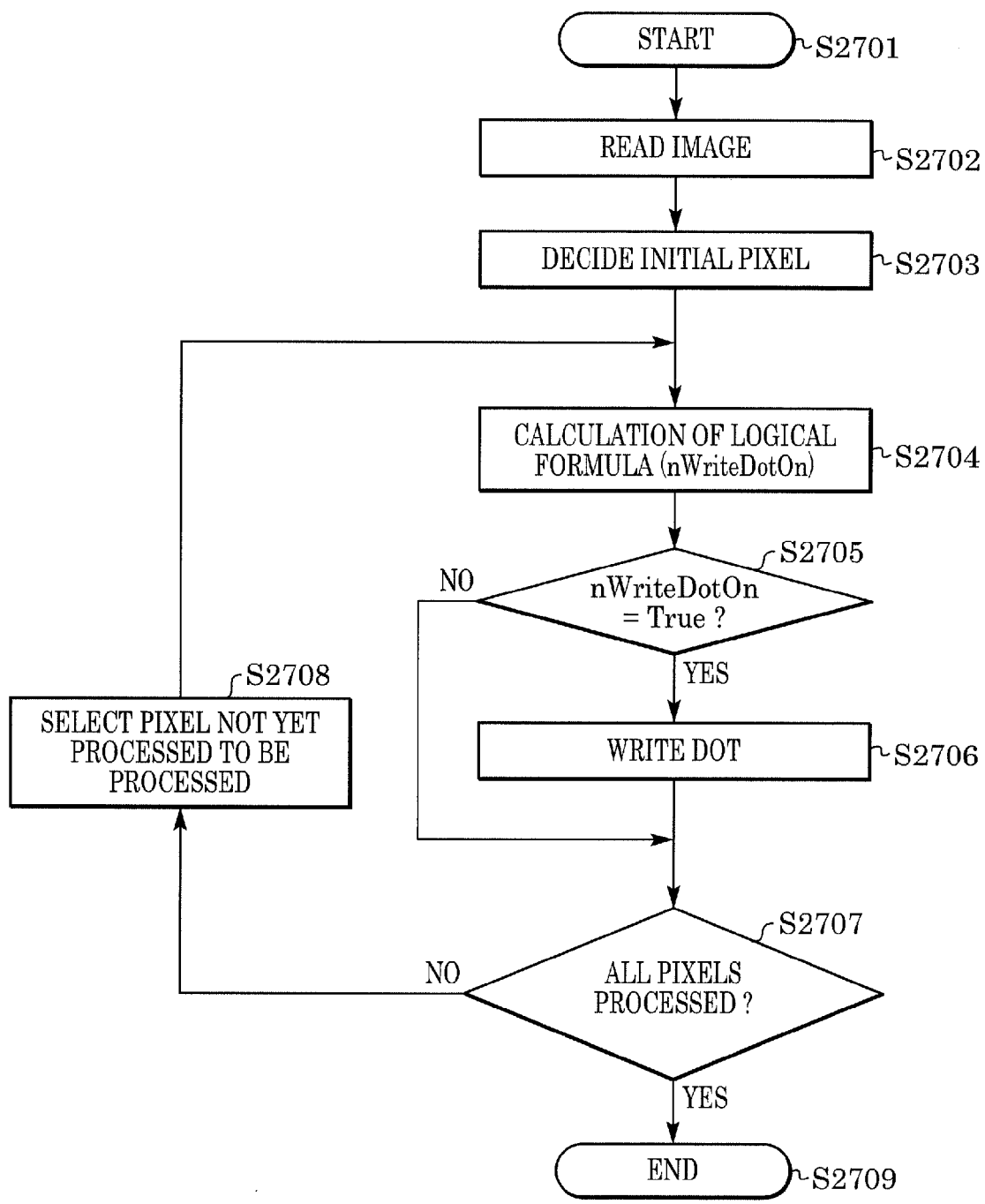
FIG. 11 is a flowchart showing an example of a copy-forgery-inhibited pattern drawing process.

FIG. 11 is a flow chart showing details of the copy-forgery-inhibited pattern image producing process executed in S1901 of FIG. 9 and S1908 of FIG. 10 according to the one embodiment of the present invention. The copy-forgery-inhibited pattern image producing process is described next with reference to FIG. 11.

First, the copy-forgery-inhibited pattern image producing process is started in step S2701. Specifically, a copy-forgery-inhibited pattern image producing command and the copy-forgery-inhibited pattern image print setting information are input to the copy-forgery-inhibited pattern processing unit 205. Then, in step S2702, the copy-forgery-inhibited pattern processing unit 205 reads an input background image, a background threshold pattern, a foreground threshold pattern, a base image, and a camouflage image. The base image means image data serving as a base in producing the copy-forgery-inhibited pattern image. The base image is produced by the despooler 305 in accordance with the various items of setting information shown in FIG. 6. Also, the input background pattern means image data providing an underlay in drawing the copy-forgery-inhibited pattern image, e.g., image data providing a white image in its entirety. The input background image is not necessarily required.

In step S2703, the copy-forgery-inhibited pattern processing unit 205 decides an initial pixel in producing the copy-forgery-inhibited pattern image. For example, when the copy-forgery-inhibited pattern image is produced in the whole print enable area of an A4-sheet by executing image processing in sequence of raster scan from an upper left corner to a lower right corner, the upper left corner of the print enable area is set as the initial position. In this case, the print enable area is equal to an area of the copy-forgery-inhibited pattern image.

Then, in step S2704, the copy-forgery-inhibited pattern processing unit 205 executes a process of arranging the background threshold pattern, the foreground threshold pattern, the base image, and the camouflage image in a tile array from the upper left corner through calculation based on the following formula (1). With this calculation, it is determined whether a pixel value corresponding to a dot for printing is written in the relevant pixel position. The pixel value corresponds to the input color information. Here, each of the background threshold pattern and the foreground threshold pattern means image data made up of "1" and "0" corresponding respectively to write and non-write of a dot. That image data is binary-coded data obtained by using a dither matrix suitable for producing the foreground image (latent image) or the background image.

$$N\text{WriteDotOn} = n\text{Camouflage} \times (n\text{SmallDotOn} \times \neg n\text{HiddenMark} + n\text{LargeDotOn} \times n\text{HiddenMark}) \quad (1)$$

where:
nCamouflage is 0 if a target pixel in the camouflage image is a pixel constituting the camouflage pattern, otherwise nCamouflage is 1;
nSmallDotOn is 1 if the pixel value of the background threshold pattern represents black, and nSmallDotOn is 0 if the pixel value of the background threshold pattern represents white (colors are not limited to black and white);
nLargeDotOn is 1 if the pixel value of the foreground threshold pattern represents black, and nLargeDotOn is 0 if the pixel value of the foreground threshold pattern represents white (colors are not limited to black and white);
¬nHiddenMark is 1 if a target pixel in the base image is a pixel constituting the latent image, and ¬nHiddenMark is 0 if a target pixel in the base image is a pixel constituting the background image; and
nHiddenMark is negation of ¬nHiddenMark, namely, nHiddenMark is 0 in the latent image (foreground-image area) and nHiddenMark is 1 in the background-image area.

It is not always required to execute the calculation using all of the components of the formula (1) for each target pixel to be processed. The processing speed can be increased by omitting unnecessary calculation steps.

For example, if nHiddenMark=1, ¬nHiddenMark=0, and if nHiddenMark=0, ¬nHiddenMark=1. Accordingly, if nHiddenMark=1, a value of the following formula (2) can be regarded as a value of nLargeDotOn, and if nHidden- Mark=0, a value of the following formula (2) can be regarded as a value of nSmallDotOn.

Also, since a value of nCamouflage is used in multiplication applied to all of the other components as seen from the formula (1), nWriteDotOn=0 if nCamouflage=0. Accordingly, if nCamouflage=0, the calculation of the following formula (2) can be omitted:

$$(n\text{SmallDotOn} \times \neg n\text{HiddenMark} + n\text{LargeDotOn} \times n\text{HiddenMark}) \quad (2)$$

Further, in the produced copy-forgery-inhibited pattern image, an image having a size corresponding to the least common multiple of each of vertical and horizontal lengths of the background threshold pattern, the foreground threshold pattern, the base image, and the camouflage image in a tile array is a minimum unit of repetition. Therefore, the processing time required for producing the copy-forgery-inhibited pattern image by the processing unit 205 can be cut by producing a part of the copy-forgery-inhibited pattern image, which corresponds to the minimum unit of repetition, as a copy-forgery-inhibited pattern image block and then repeatedly arranging the block in a tile array so as to cover the size of a copy-forgery-inhibited pattern image area.

Next, in step S2705, the CPU 1 determines the calculation result (value of nWriteDotOn) obtained in step S2704. Specifically, if nWriteDotOn=1, the control flow proceeds to step S2706, and if nWriteDotOn=0, it proceeds to step S2707.

In step S2706, a process of writing the pixel value corresponding to the dot for printing is executed. Here, the pixel value can be changed depending on the color of the copy-forgery-inhibited pattern image. Further, the copy-forgery-inhibited pattern image can be produced as a color image by setting the pixel value in match with colors of toner or ink used in the printer. As an alternative, it is also possible to employ any desired secondary color by combining several colors of toner or ink.

In step S2707, it is determined whether all of the pixels in the target area to be processed have been processed. If all of the pixels in the target area have not yet completely been processed, processing proceeds to step S2708 where a pixel not yet processed is selected. Then, the processing of steps S2704 to S2706 is executed again for the selected pixel.

As a result of the process described above, the copy-forgery-inhibited pattern image can be produced.

Thus, the copy-forgery-inhibited pattern image is produced with the above-described process. This process is common to step S1901 of FIG. 9 and step S1908 of FIG. 10. The copy-forgery-inhibited pattern image data and the document data both produced in accordance with one of the flows shown in FIGS. 9 and 10 are transmitted to the printer and finally output after being developed and combined with each other in a development memory in the printer.

This embodiment enables the user to decide whether the transparent print or the overlap print is to be performed, for example, depending on the presence or absence of a blank area or an area full of a white image in the document data, and the application used for producing the document data. Consequently, an image processing apparatus that is more convenient for the user can be realized in relation to the copy-forgery-inhibited pattern printing.

The process of combining the copy-forgery-inhibited pattern image data and the document image data with each other into a bit map image in execution of the printing is performed by the printer 1500. In the combining process performed in the printer, when the overlap print is set, the document image data is first developed in a bit map memory, and the copy-forgery-inhibited pattern image data is then developed to be written over the document data. At that time, if the copy-forgery-inhibited pattern image data were simply overwritten, the document image would disappear. Therefore, in the case of the overlap print being set, complete overwriting of the document data with the copy-forgery-inhibited pattern image data is avoided by utilizing logical rendering, such as AND/OR. For example, when a pixel of the bit map image obtained by developing the document data has a value corresponding to white, the processing is executed such that the data in the bit map memory corresponding to the relevant pixel position is overwritten with the copy-forgery-inhibited pattern image data corresponding to the relevant pixel, and pixels having values other than white are not overwritten with the copy-forgery-inhibited pattern image data.

Several examples of the process of previewing the copy-forgery-inhibited pattern image are described next.

Figure 12:
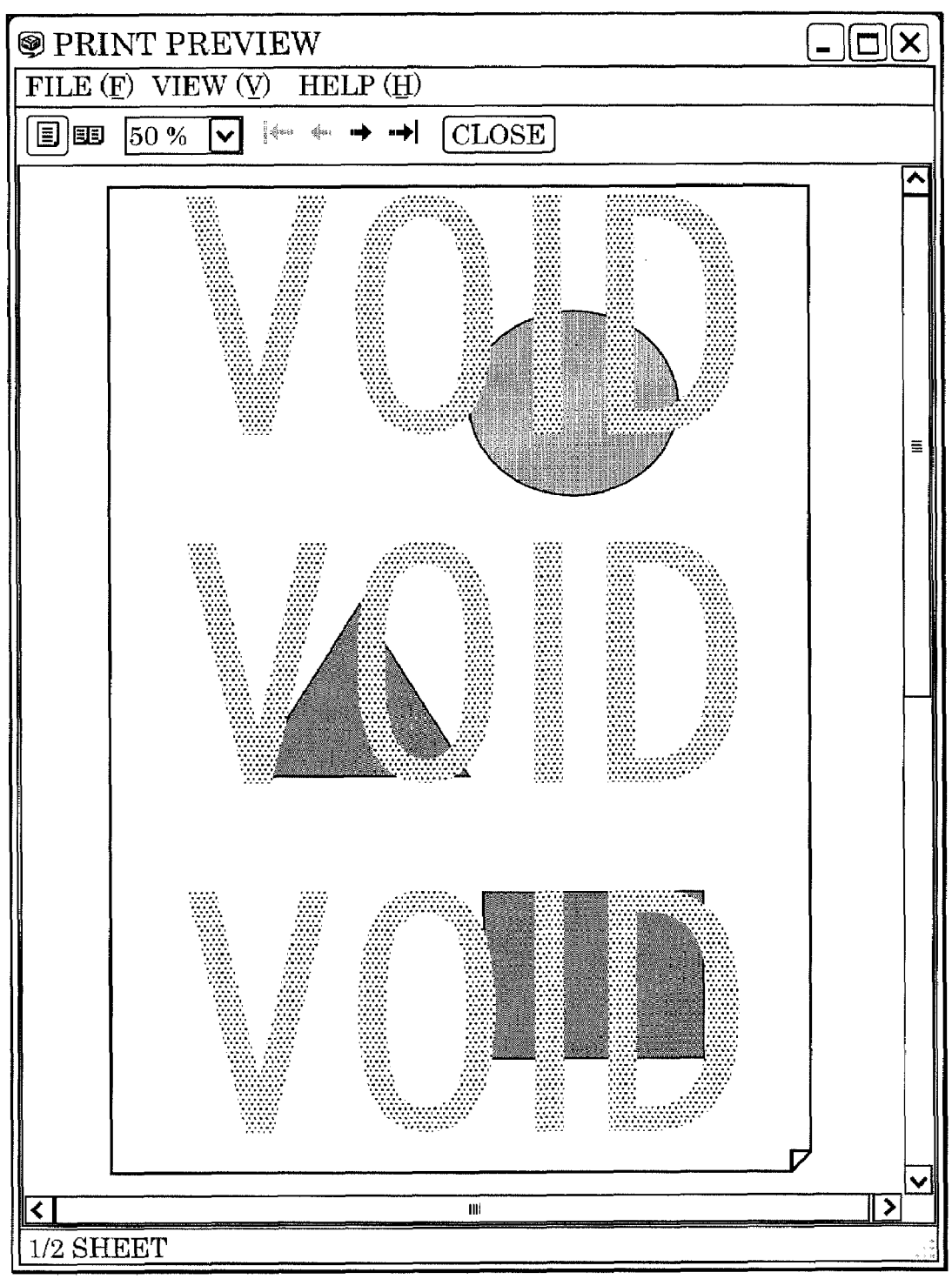
FIG. 12 shows a display example provided by the print previewer.
Figure 13:
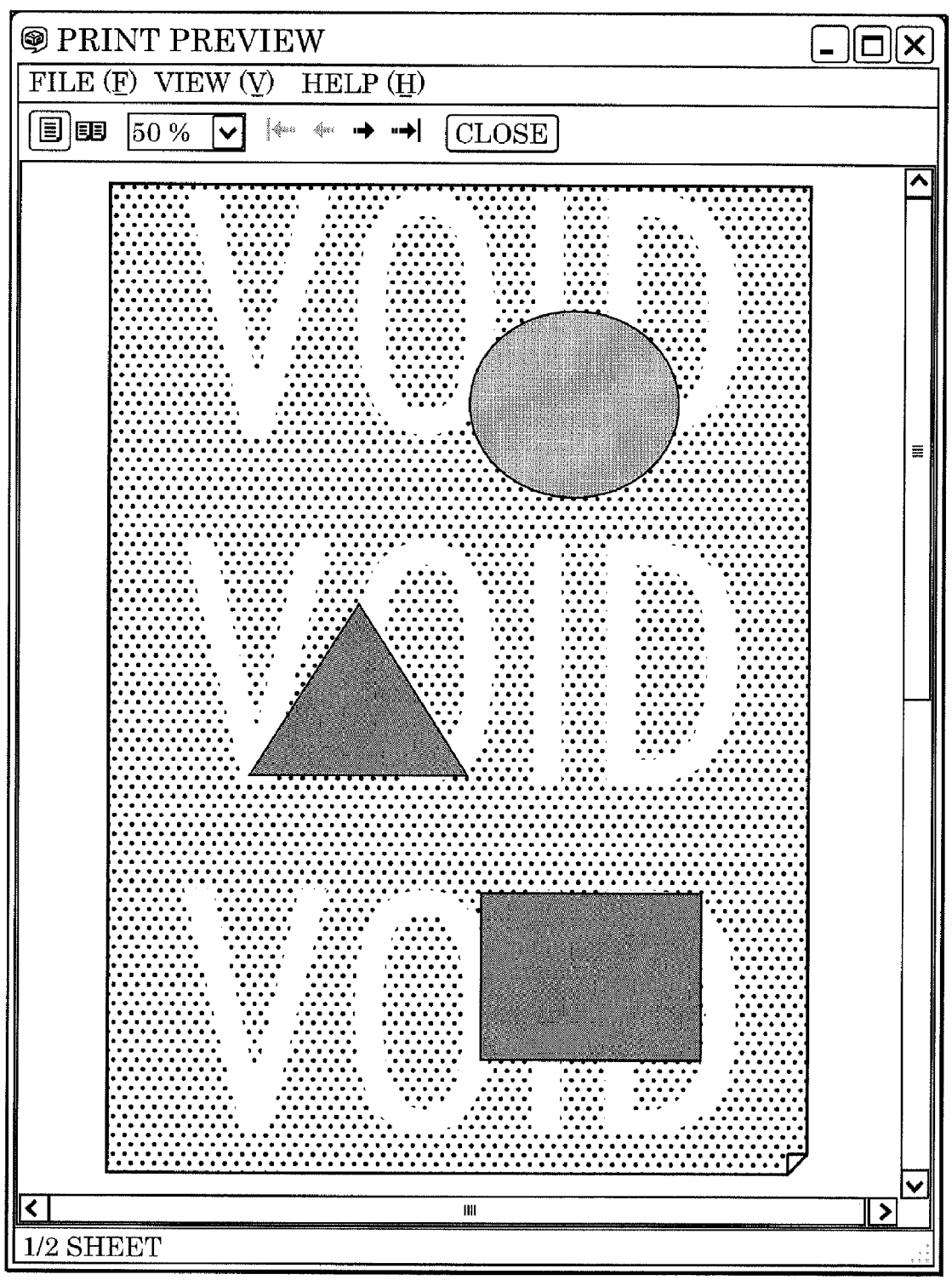
FIG. 13 shows another display example provided by the print previewer.

FIGS. 12 and 13 show example displays, based on the preview screen shown in FIG. 5, by the print previewer 306 (FIG. 3) according to the embodiment of the present invention. FIG. 12 shows a state in which an image to be output for printing and a latent image (character string of "VOID") are displayed (turned on). FIG. 13 shows the case displaying the copy-forgery-inhibited pattern image such that the character string (VOID) turned on in FIG. 12 is expressed by hollow-space characters. In other words, the image shown in FIG. 12 corresponds to a copy in which the latent image (VOID) is visualized after copying.

Further, the image shown in FIG. 13 corresponds to a copy in which the character string (VOID) is made visually recognizable as hollow-space characters after copying.

The copy images shown in FIGS. 12 and 13 and the image shown in FIG. 5, in which the copy-forgery-inhibited pattern image is not applied, or the image in which the latent image and the background image are both applied to the document data to be printed (i.e., the print image in which the copy-forgery-inhibited pattern image is applied), are displayed in a switching manner at predetermined time intervals so that the user can recognize, with the afterimage effect of a visual sense, the latent image (character string of "VOID") which is not clearly discernable by human eyes when those images are separately displayed as they are.

Therefore, even if the density of the latent image and/or the background image becomes lighter or the contours of those images become not so clear as a result of the display process, the user can reliably recognize the latent image. Particularly, the user can reliably recognize the latent image in relation to the image to be output for printing. While FIGS. 12 and 13 show the examples displayed by the print previewer 306, it is apparent from the above description that the present invention is also similarly applicable to display operation executed by the setting change editor 307.

FIGS. 12 and 13 are illustrations of the entire preview screen. Details of the above-described process are provided later with reference to FIG. 14.

Figure 30:
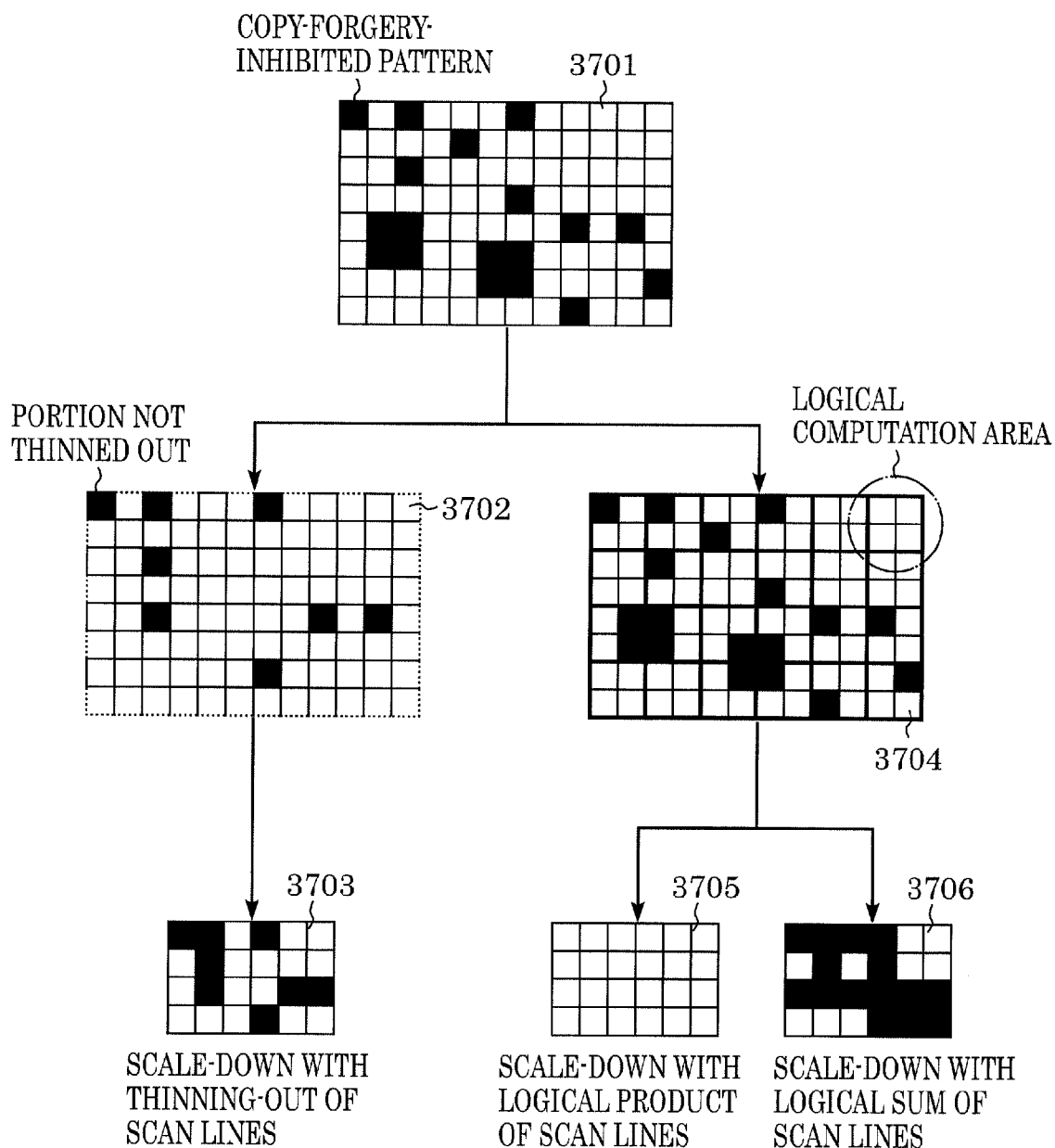
FIG. 30 shows examples in which the copy-forgery-inhibited pattern image (dot data) is scaled down to a ½ size in accordance with three algorithms.

The data for displaying the image including the copy-forgery-inhibited pattern image is obtained by the scaling-down process based on thinning-out in accordance with one of the three algorithms described above with reference to FIG. 30.

Figure 14:
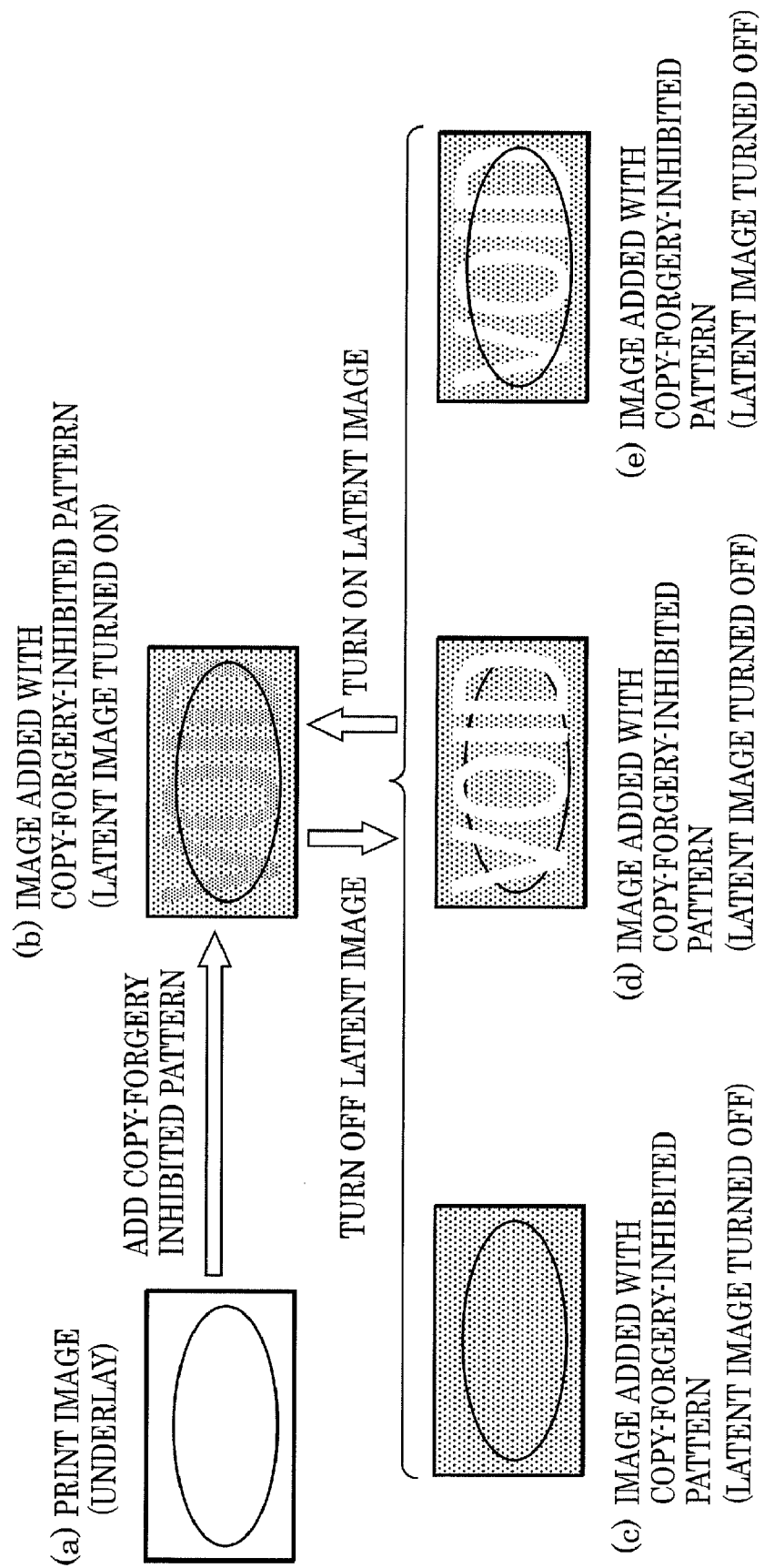
FIG. 14 is an illustration for exemplifying display operation.

FIG. 14 illustrates the above display operation and other examples of the display operation according to this embodiment.

Referring to FIG. 14, "(a) print image (underlay)" represents an "ellipse" that is the contents to be output for printing. When the copy-forgery-inhibited pattern printing is not set, the preview screen is displayed in the state of "print image (underlay)".

Also, "(b) image added with the copy-forgery-inhibited pattern (latent image turned-on)" shown in FIG. 14 is a preview screen presented when the copy-forgery-inhibited pattern image is added to "(a) print image (underlay)". In this state, the character string "VOID" is reproduced. However, because the density of each of the latent image and the background image is set low and the contour of the latent image is somewhat blurred with the image scaling-down process, it is difficult to recognize the contents of the copy-forgery-inhibited pattern image even when the user carefully looks at only the image (b). Particularly, when the size of the latent image is small, a difficulty is increased in recognizing the latent image.

Further, "(c) image added with the copy-forgery-inhibited pattern (latent image turned-off)", "(d) image added with the copy-forgery-inhibited pattern (latent image turned-off)", and "(e) image added with the copy-forgery-inhibited pattern (latent image turned-off)" shown in FIG. 14 represent respective images obtained when a process of "turning off" the latent image, i.e., a process of not displaying the latent image, is performed from the state of "(b) image added with the copy-forgery-inhibited pattern (latent image turned-on)". More specifically, "(c) image added with the copy-forgery-inhibited pattern (latent image turned-off)" represents the case in which the latent image is turned off, and the background image and the print image (document image) are applied to an area of the latent image as well. Also, "(d) image added with the copy-forgery-inhibited pattern (latent image turned-off)" represents the case in which the latent image is turned off, and neither the background image nor the document image (ellipse) is displayed in the area of the latent image. In other words, the area of the latent image is displayed to be white. Further, "(e) image added with the copy-forgery-inhibited pattern (latent image turned-off)" represents the case in which the latent image and the background image are the same as those in "(d) image added with the copy-forgery-inhibited pattern (latent image turned-off)", but the document image (ellipse) is further displayed in the area where the latent image is turned off.

FIG. 13 described above corresponds to the state (e) in FIG. 14.

Thus, by switching turning-on/off of the latent image between the state of "(b) image added with the copy-forgery-inhibited pattern (latent image turned-on)" and the state of "(c) image added with the copy-forgery-inhibited pattern (latent image turned-off)", "(d) image added with the copy-forgery-inhibited pattern (latent image turned-off)" or "(e) image added with the copy-forgery-inhibited pattern (latent image turned-off)" at intervals of a predetermined time, the user can recognize, with the afterimage effect of a visual sense, general contours of the latent image and the background image which are hard to recognize by human eyes when those images are separately displayed. In addition to the effect of such switching display, because "(d) image added with the copy-forgery-inhibited pattern (latent image turned-off)" and "(e) image added with the copy-forgery-inhibited pattern (latent image turned-off)" are displayed in the state of the latent image being "hollow", it is possible to more clearly recognize the latent image and the background image in a relative sense.

Here, the time intervals in display switching, i.e., the time during which "(b) image added with the copy-forgery-inhibited pattern (latent image turned-on)" is displayed (i.e., latent image display time) and the time during which "(c) image added with the copy-forgery-inhibited pattern (latent image turned-off)", "(d) image added with the copy-forgery-inhibited pattern (latent image turned-off)", or "(e) image added with the copy-forgery-inhibited pattern (latent image turned-off)" is displayed (i.e., latent image non-display time), are each set to at least such a value as enabling the user to recognize the latent image, etc. with the afterimage effect.

By performing the display operation and the display switching in such a way, the user can recognize addition of the latent image and the background image, general contours thereof, and the relationships between these images and the printed output image. Further, since the printed output image is not affected by turning-on/off of the latent image, the user can satisfactorily recognize the print image.

Even in the case of "(c) image added with the copy-forgery-inhibited pattern (latent image turned-off)" in which the latent image does not appear at all, it becomes possible to recognize the latent image itself with the afterimage effect by repeating the turning-on/off of the latent image between "(c)" and "(b) image added with the copy-forgery-inhibited pattern (latent image turned-on)". In the case of "(d) image added with the copy-forgery-inhibited pattern (latent image turned-off)", the display state of the latent image is significantly changed with the display switching, a recognition level can be further increased.

Figure 15:
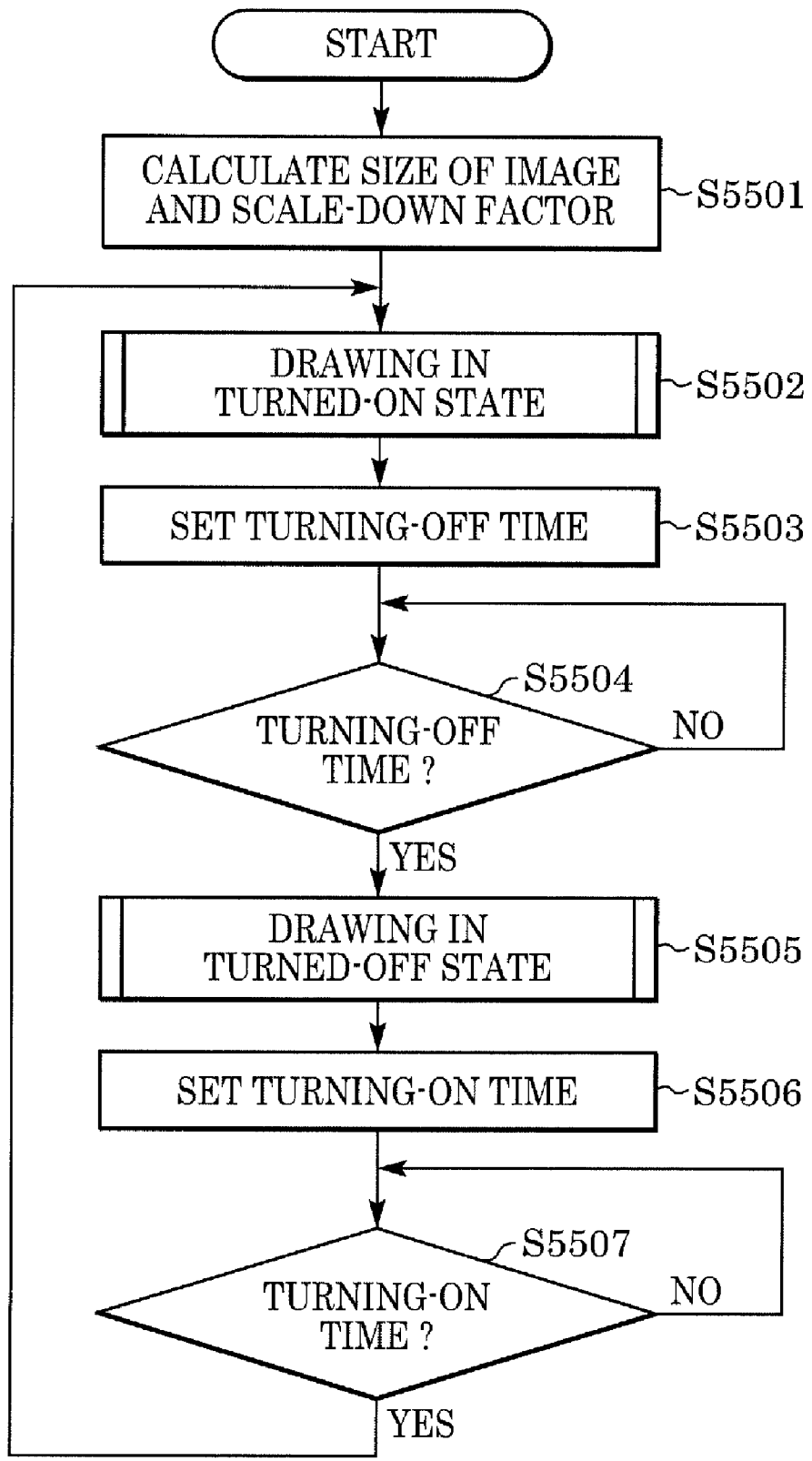
FIG. 15 is a flowchart showing a process for the display operation.

FIG. 15 is a flowchart showing the process for the above-described display operation.

This process is started up in response to a display request issued for the setting change editor 307 or the previewer 306 from the spool file manager 304. This process is performed by the CPU 1 executing a preview display program for the copy-forgery-inhibited pattern image. Also, the following steps are executed by the CPU 1. Instead of the CPU 1, a rendering processor or the like dedicated for the preview process may also be used to execute this process. Further, the preview image may be drawn (rendered) in the RAM 2 within the host computer or in another dedicated memory separately provided for the preview image.

In step S5501, the size of an actually displayed sheet image and the scale-down factor based on the sheet image size are calculated from the size of a physical sheet set in the system and the display area of a virtual sheet defined by the setting change editor 307 or the previewer 306. In accordance with the calculation result, an outline of the actually displayed sheet image is drawn on a screen by using the graphics engine. In step S5502, the print image in the state of the latent image of the copy-forgery-inhibited pattern image being turned on is drawn in the virtual sheet, which has already been drawn, in accordance with the previously calculated scale-down factor, as described later with reference to FIG. 16.

Then, in step S5503, the time at which the latent image is turned off (to stop display) is calculated from the current time and the latent image display time during which the latent image is held in the display state. The system waits until the current time reaches the turning-off time (step S5504). If the current time reaches the turning-off time, the print image in the state of the latent image being turned off is drawn in the virtual sheet, as described later with reference to FIG. 17, at the previously calculated scale-down factor (step S5505).

Then, in step S5506, the time at which the latent image is turned on is calculated from the current time and the latent image non-display time during which the latent image is held in the turned-off state. The system waits until the current time reaches the turning-on time (step S5507). If the current time reaches the turning-on time, the process subsequent to step S5502 is repeated again.

The latent image display time and the latent image non-display time may be included in the data format of the copy-forgery-inhibited pattern print setting information shown in FIG. 6, or may be incorporated as constant values in the program. After being started up, this process can be brought to an end at any time when an event of ending the display operation of the previewer 306 or the setting change editor 307 occurs.

Figure 16:
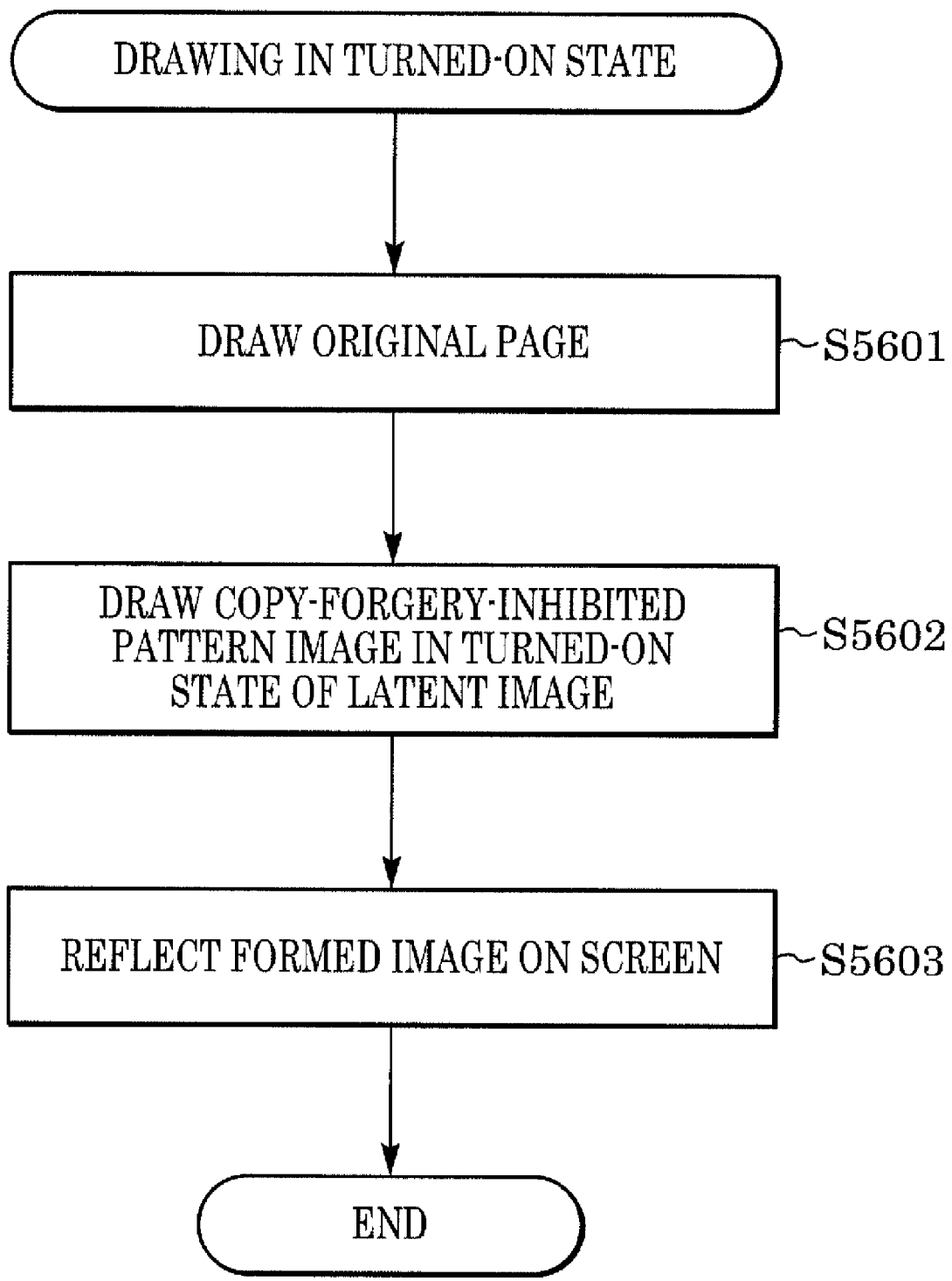
FIG. 16 is a flowchart showing a latent-image turned-on state display process in the display operation.

The display process in the latent image turned-on state is described below with reference to FIG. 16. In step S5601, drawing (rendering) of a document image (original page) to be output for printing is executed. This rendering can be made using, e.g., a development memory, in the host computer.

Thus, in step S5601, the original page is drawn in accordance with the previously calculated scale-down factor while referring to the page description file 303 that describes intermediate codes in the virtual sheet area. Then, in step S5602, the copy-forgery-inhibited pattern processing unit 205 executes a similar scaling-down process to obtain a copy-forgery-inhibited pattern image. This image is drawn over the original image, which has been drawn in step S5601, by using rendering logic of AND. Finally, the image produced in step S5602 is reflected on the screen at a time. In other words, the print image thus displayed is one directly reflecting the image actually printed on a sheet.

Figure 17:
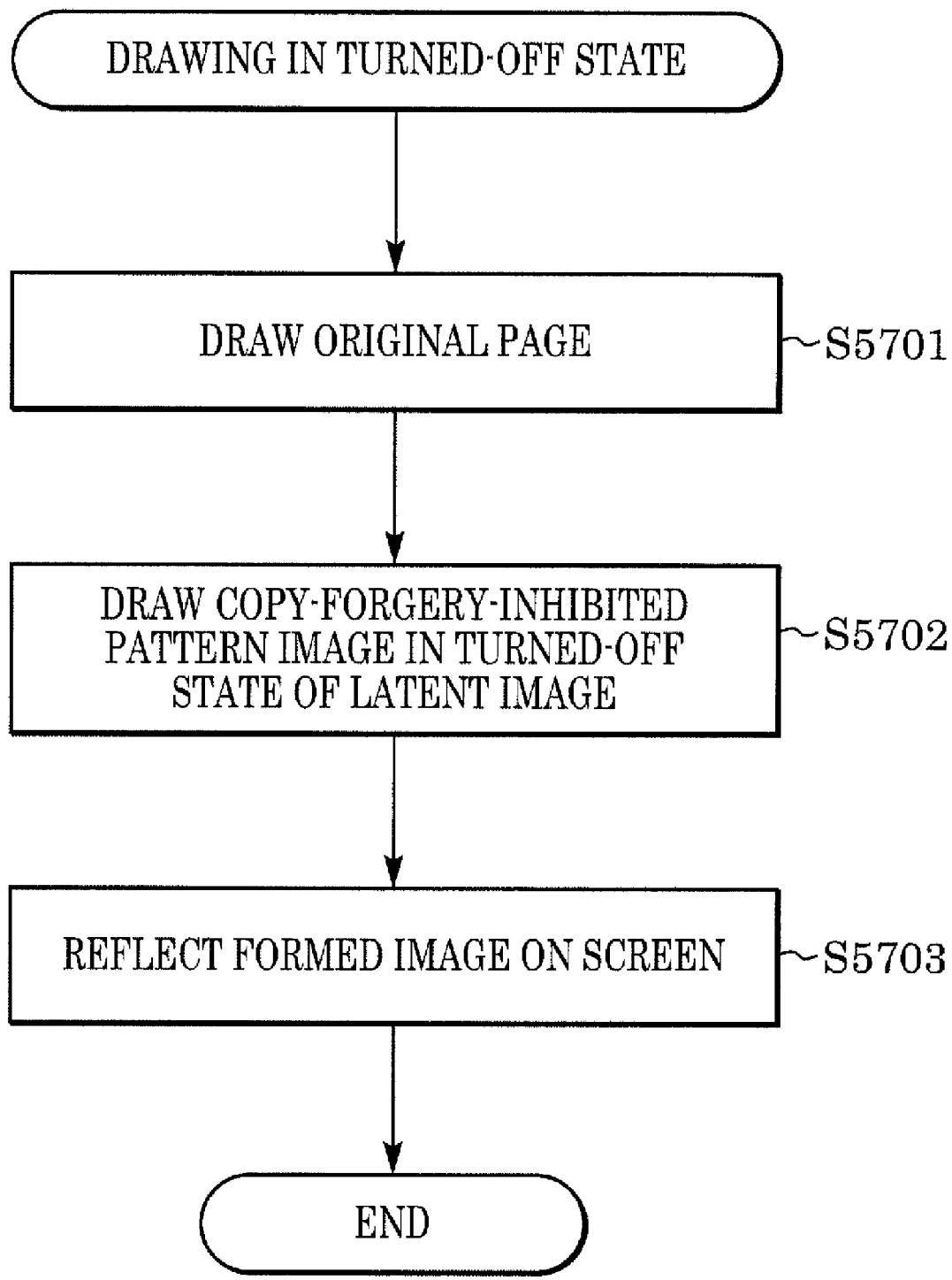
FIG. 17 is a flowchart showing a latent-image turned-off state display process in the display operation.

The display process in the latent image turned-off state is described next with reference to FIG. 17.

First, in step S5701, the original page is drawn with the same process as in step S5601. Then, in step S5702, an intermediate copy-forgery-inhibited pattern image corresponding to one of (c), (d) and (e) in FIG. 14 is produced and drawn over the original image which has been drawn in step S5701. More specifically, in the case of not displaying the latent image, the copy-forgery-inhibited pattern processing unit 205 produces a copy-forgery-inhibited pattern image constituted by only a background image and including no latent image. This image is drawn over the original image, which has been drawn in step S5701, by using rendering logic of OR. In the case of displaying the latent-image area (e.g., character string "VOID" in the example shown herein) as hollow-space characters, the copy-forgery-inhibited pattern processing unit 205 produces a copy-forgery-inhibited pattern image constituted by only a background image and including no latent image. This image is drawn over the original image, which has been drawn in step S5701, by using rendering logic of OR. Further, the copy-forgery-inhibited pattern processing unit 205 produces a copy-forgery-inhibited pattern image in which the density of the background image is a maximum amount and the density of the latent image is 0. In this image, the background area is black and the character string "VOID" is white. This image is drawn over the previously drawn image by using rendering logic of AND.

Figure 18:
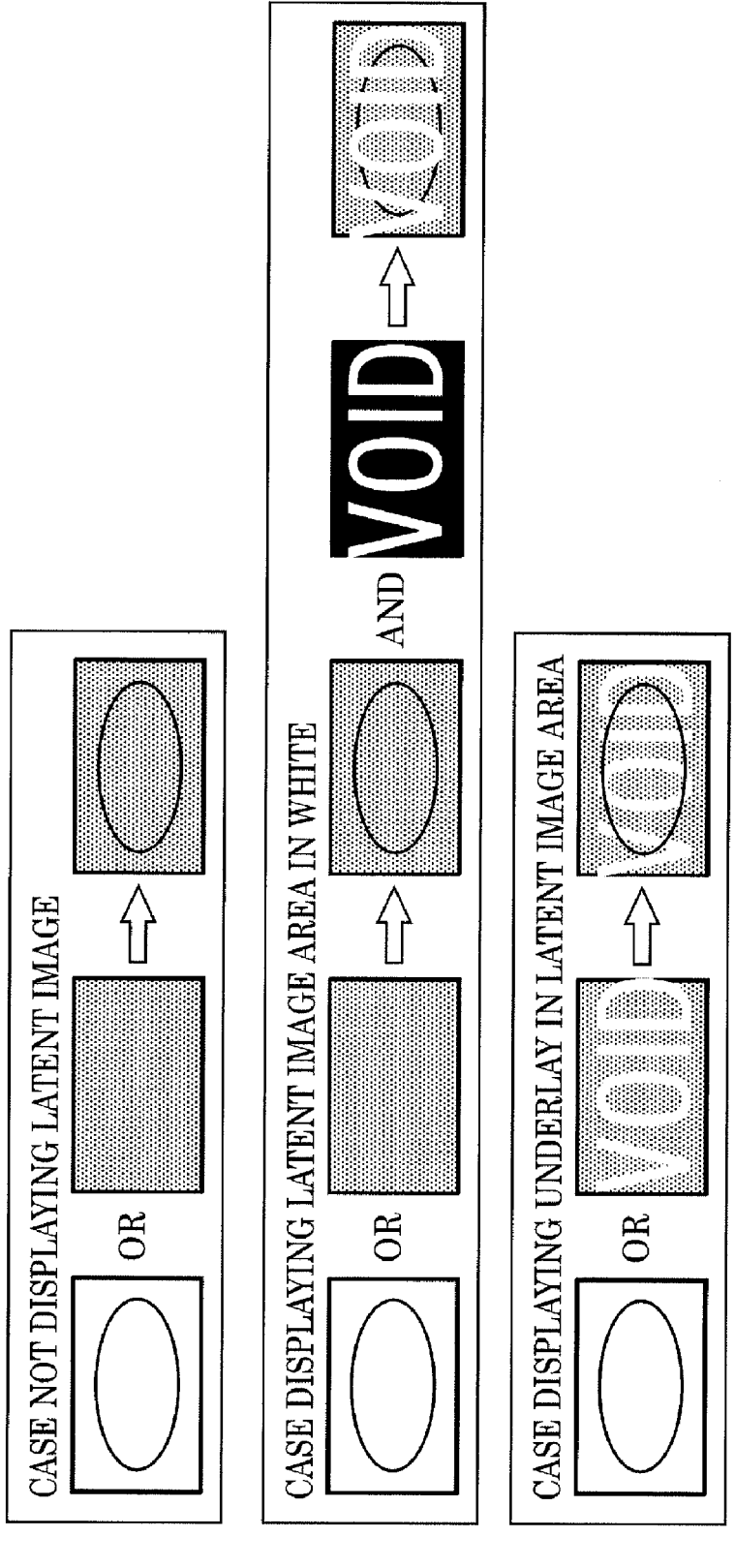
FIG. 18 shows steps of the latent-image turned-off state display process and respective images.

In the case of displaying the original image, i.e., the underlay, in the latent-image area, the copy-forgery-inhibited pattern processing unit 205 produces a copy-forgery-inhibited pattern image in which the density of the latent-image area (character string "VOID") is 0. In the image thus produced, the background area is displayed as an image having been subjected to the usual copy-forgery-inhibited pattern image processing and the latent-image area is displayed as a white image. This image is drawn over the original image, which has been drawn in step S5701, by using rendering logic of OR so that the original image as an underlay can be displayed in the latent-image area. FIG. 18 shows respective display processes and images obtained in the three cases described above.

The produced image is reflected on the screen at a time in step S5703. The reason why the produced image is reflected on the screen at a time in each of step S5603 of FIG. 16 and step S5703 of FIG. 17 is that, if the image during the producing process were displayed in real time, it would be difficult for the user to recognize the displayed image, or a quality level in recognition of the copy-forgery-inhibited pattern image and the original image would deteriorate.

By replacing the background image and the latent image with each other in the flowcharts described above with reference to FIGS. 16 and 17, it is possible to blink the background image of the copy-forgery-inhibited pattern image. Specifically, in each of (c), (d) and (e) in FIG. 14, the character string "VOID" is always displayed (turned on) and the background image is turned off. This case enables two images to be previewed which correspond respectively to the state of a printed output including the copy-forgery-inhibited pattern image set such that the character string is to be visualized after copying, and the state of a copy obtained by copying the printed output.

Stated another way, the preview display indicated by (d) and (e) in FIG. 14 is intended to preview images corresponding respectively to the state of a printed output including the copy-forgery-inhibited pattern image set such that the character string appears as hollow-space characters after copying, and the state of a copy obtained by copying the printed output.

Preferably, display control is executed so as to switch the above-described preview display in response to the presence or absence of the check 2213 in FIG. 8. Such control can be realized with the preview display program acquiring the information held in 2006 of FIG. 6 and switching the preview execution program correspondingly.

In the above-described embodiment, the latent image and the background image of the copy-forgery-inhibited pattern image are rendered and developed in match with respective density levels of the copy-forgery-inhibited pattern image that is actually printed. In other words, the above embodiment is described as adding the copy-forgery-inhibited pattern image of the actual setting density level to the document image data shown at (b) in FIG. 14. Also, in (c), (d) and (e) of FIG. 14, the background image is displayed at the actual setting density level. However, the present invention is not limited to that embodiment, and the print process may be adjusted so as to increase the density of the latent-image area and to reduce the density of the background-image area for an improvement of viewability. For example, in (b) of FIG. 14, the density of the latent-image area may be increased from the actually set density level. Also, the density of the background-image area may be reduced from the actually set density level. These adjustments may be performed separately or in a combined manner. Such a process can be realized by producing and displaying the copy-forgery-inhibited pattern image based on the density of the copy-forgery-inhibited pattern image for preview apart from the density of the copy-forgery-inhibited pattern image for printing. Further, such control is likewise effectively applied to another embodiment described below.

Figure 19:
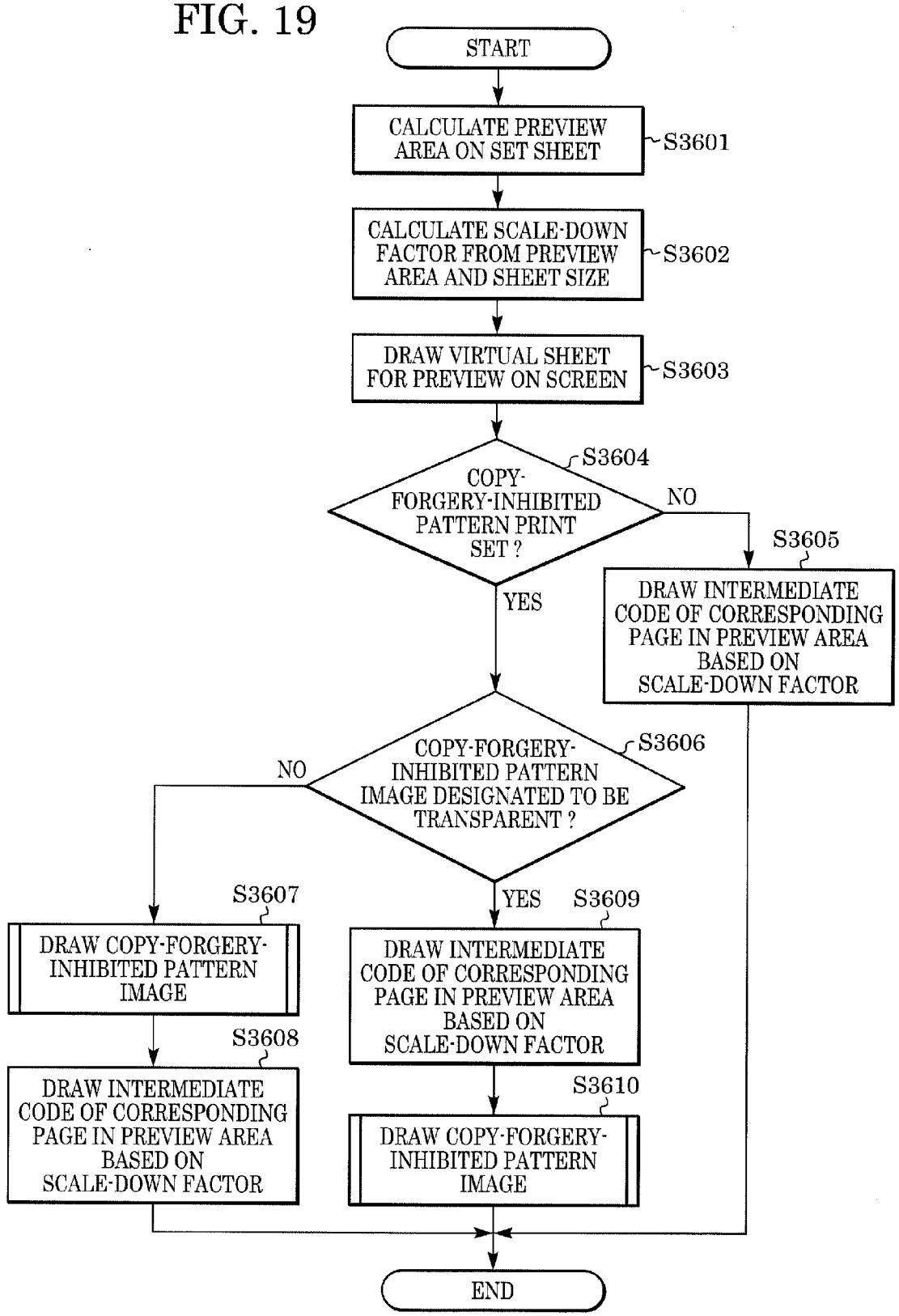
FIG. 19 is a flowchart showing a process of displaying a printed output image, including a copy-forgery-inhibited pattern image, according to a second embodiment of the present invention.

FIG. 19 is a flowchart showing a process of displaying a printed output image, including a copy-forgery-inhibited pattern image, according to another embodiment of the present invention. With this display process, display switching is performed as described later with reference to FIGS. 21 and 22 so that the user can easily visually recognize the latent image, etc. Unless otherwise specified, the following process is executed with the same means and functions as those in the embodiment described above.

First, in step S3601, the size of a preview sheet area corresponding to the size of a virtual sheet displayed on the print preview is calculated from the sheet size of a physical page currently set by the application and the display enable area of the virtual sheet defined by the print previewer 306 (FIG. 3). Then, in step S3602, a scale-down factor is calculated from the sheet size and the preview sheet area. Further, in step S3603, the virtual sheet is drawn in the display enable area of the virtual sheet on the screen through the graphics engine 202, thus causing the user to recognize the sheet displayed. In step S3604, it is determined whether the copy-forgery-inhibited pattern printing is set for the current print page by the user based on the physical page information produced by the spool file manager 304. If the copy-forgery-inhibited pattern printing is not set (no in step S3604), processing proceeds to step S3605, and if the copy-forgery-inhibited pattern printing is set (yes in step S3604), processing proceeds to step S3606.

In step S3605, intermediate code data of the logical page are drawn in the preview sheet area through the graphics engine 202 to be displayed on the screen in accordance with the scale-down factor calculated in step S3602, taking into account other settings as well if any setting requiring scale-up/down of the logical page, such as Nup print or poster print, is set for the current physical page.

On the other hand, if it is determined in step S3604 that the copy-forgery-inhibited pattern printing is set, whether transparent print is designated for the copy-forgery-inhibited pattern image with respect to the print image (logical page) is determined in step S3606. Step S3606 determines a sequence in which the copy-forgery-inhibited pattern image and the print image are arranged. Stated another way, it is determined whether the printing is designated so as to arrange the copy-forgery-inhibited pattern image on the underlying side relative to the print image (i.e., transparent print designation) or to arrange the copy-forgery-inhibited pattern image on the overlying side relative to the print image (i.e., overlap print designation).

If it is determined in step S3606 that the transparent print is designated for the copy-forgery-inhibited pattern image, processing proceeds to step S3607 where a copy-forgery-inhibited pattern image drawing process is executed as described below with reference to FIG. 20. Then, in step S3608, the logical page is drawn as described above in connection with step S3605. The display process shown in FIG. 19 then ends.

If it is determined in step S3606 that the transparent print is not designated for the copy-forgery-inhibited pattern image, i.e., if the overlap print is designated, processing proceeds to step S3609 where the process of drawing the logical page is executed similarly to step S3605 (described above). The copy-forgery-inhibited pattern image drawing process described below with reference to FIG. 20 is then executed in step S3610 and the display process of FIG. 19 ends.

Figure 20:
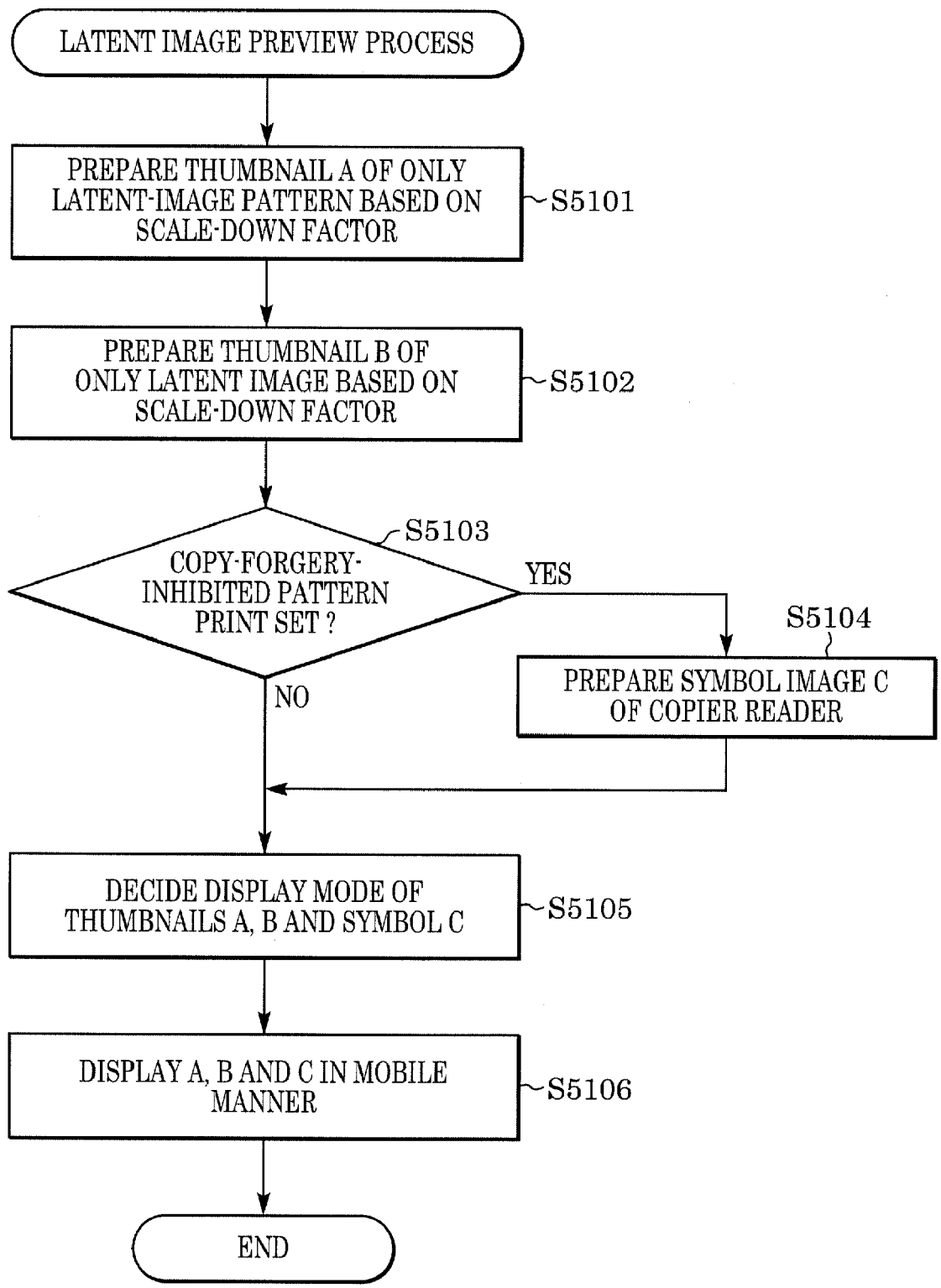
FIG. 20 is a flowchart showing details of a copy-forgery-inhibited pattern image previewing process of FIG. 19.

FIG. 20 is a flowchart showing details of the preview process for the copy-forgery-inhibited pattern image executed in step S3607 or S3610 of FIG. 19.

Referring to FIG. 20, in step S1501, a thumbnail A is first prepared which is constituted by only a latent image pattern (latent image) of the copy-forgery-inhibited pattern image and which is formed by reducing the latent image in accordance with the scale-down factor. The thumbnail A assumes a copy obtained by copying a sheet on which the copy-forgery-inhibited pattern image has been additionally printed. Then, in step S5102, a thumbnail B is prepared which is an image formed as a combination of the latent image and the background image in accordance with the scale-down factor. The thumbnail B assumes a print in the state where the copy-forgery-inhibited pattern image has been additionally printed. It is determined in step S5103 whether the copy-forgery-inhibited pattern printing is set. If it is set, a symbol image C of a copier reader (image scanner) is prepared in step S5104.

Processes of forming those thumbnail images are the same as those in the above-described embodiment.

Figure 21:
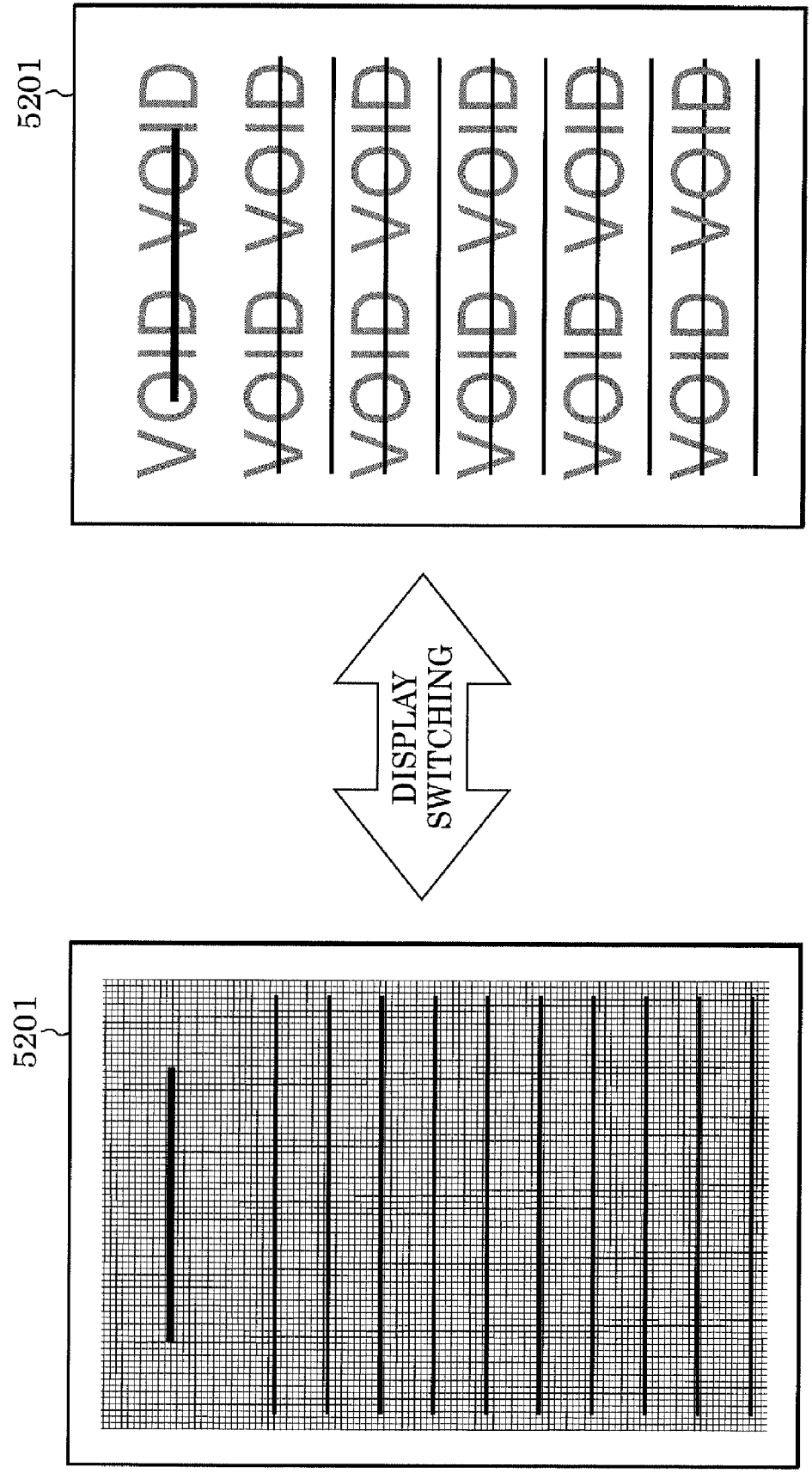
FIG. 21 illustrates examples of the display mode decided in FIG. 20.
Figure 22:
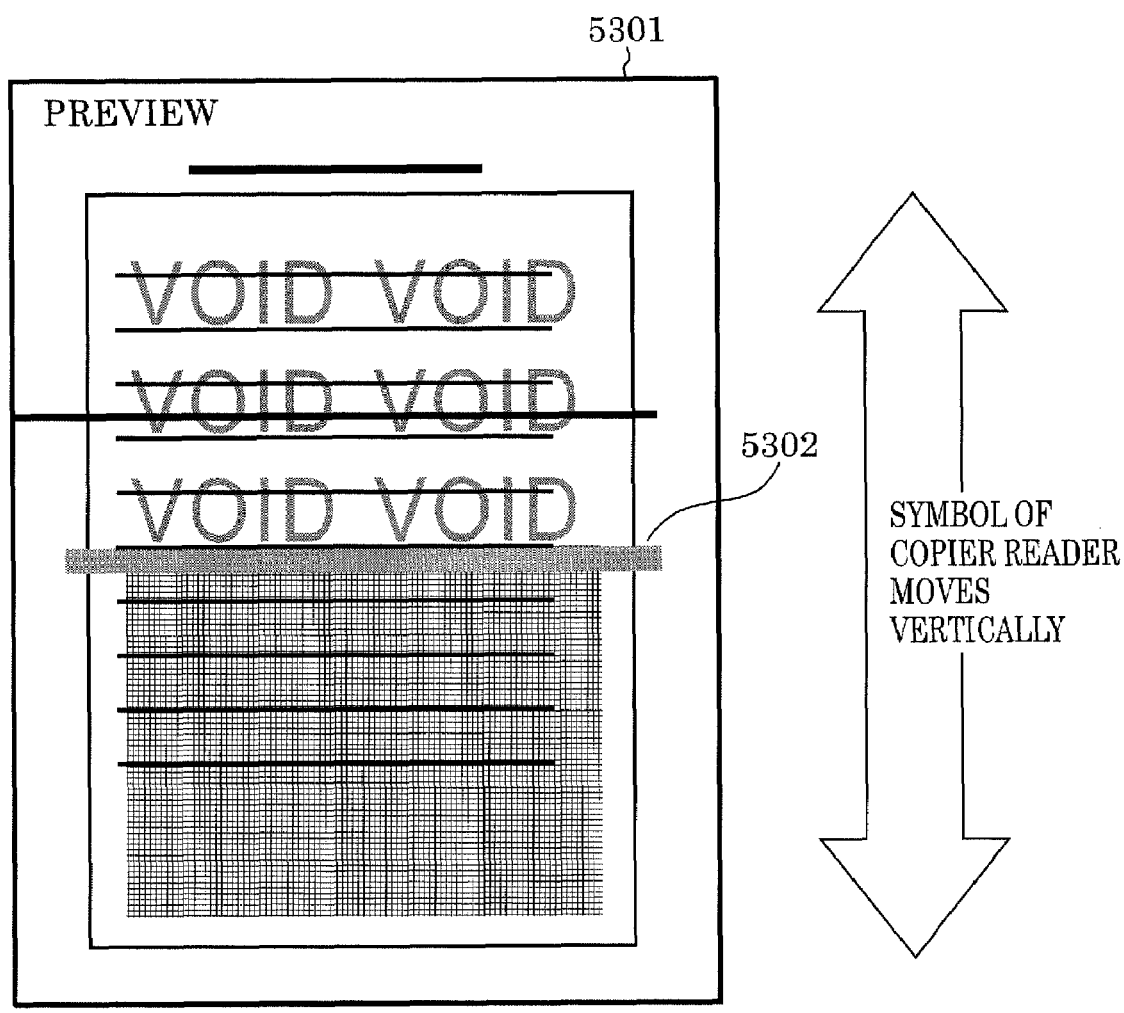
FIG. 22 is an illustration for explaining another example of the display mode decided in FIG. 20.

Thereafter, a mode of displaying the thumbnails A, B and the symbol C, such as described below with reference to FIGS. 21 and 22, is decided in step S5105. Depending on this decision, the display mode of the copy-forgery-inhibited pattern image shown in FIGS. 21 and 22, by way of example, is decided. Note that, as seen from the following description, the symbol C is not used in the display mode shown in FIG. 21. Then, in step S5106, both the thumbnails are displayed in the preview area in a mobile manner together with the image produced by the graphics engine 202 and output for printing.

FIG. 21 illustrates examples of the display mode decided in above step S5105.

FIG. 21 shows the state displaying an image 5201 in which the print output image (text) is combined with the copy-forgery-inhibited pattern image and the state displaying an image 5202 in which the print output image is combined with the latent image of the copy-forgery-inhibited pattern image except for the background image. Also, the image 5202 represents the state in which the latent image has appeared after copying a sheet on which the print output image and the copy-forgery-inhibited pattern image are printed in combined relation.

In the display operation of this embodiment, as in the above-described embodiment, the images 5201 and 5202 are displayed in a switching manner at predetermined time intervals. Thus, the display of the image 5202 enables the user to recognize the copied state of the print added with the copy-forgery-inhibited pattern image, i.e., the relationship between the latent image visualized after copying and the print output image. As a result, the user who is going to print the copy-forgery-inhibited pattern image together with the print output image can easily recognize the state of a copy obtained by copying the print, thus resulting in improved usability. In addition, as with the above-described embodiment, the user can also recognize the relationship between the latent image and the background image in the image 5201 with the afterimage effect resulting from the display switching.

The display switching may be performed by fully turning on/off the images 5201 and 5202 or fading them in/out at intervals of a certain time by using a timer. When the display is switched by fully turning on/off the images 5201 and 5202, the thumbnail B is displayed over the entire preview area in step S5106 of FIG. 20, and in response to a timer event, the thumbnail A is then displayed over the entire preview area. When the display is switched by fading in/out the images 5201 and 5202, the thumbnail B is displayed so as to gradually cover the whole preview area from its part in step S5106 of FIG. 20, and in response to a timer event, the thumbnail A is then displayed so as to gradually cover the whole preview area from its part.

FIG. 22 shows another example of the display mode decided in above step S5105.

In this example, as shown in FIG. 22, an image 5302 as a symbol of the copier reader (scanner) is vertically moved on the preview. Correspondingly, two images 5201 and 5202 are displayed in the preview area 5301 at the same time on the lower and upper sides of the symbol image 5302, respectively. The contents of the images 5201 and 5202 are the same as those shown in FIG. 21.

In this example, areas of the images 5201 and 5202 change continuously in sync with the vertical movement of the symbol image 5302. By properly setting the moving speed of the symbol image 5302, therefore, it is possible to individually recognize the latent image and the background image with the afterimage effect as described above, and to confirm appearance of the latent image gradually spreading with movement of the reader scan in the copier. Also, the moving symbol image enables the user to easily understand that the current image is a preview of the copy-forgery-inhibited pattern image, thus resulting in higher userability. Further, the user can recognize the image of the whole page and the contents and position of the latent image at the same time.

Figure 23:
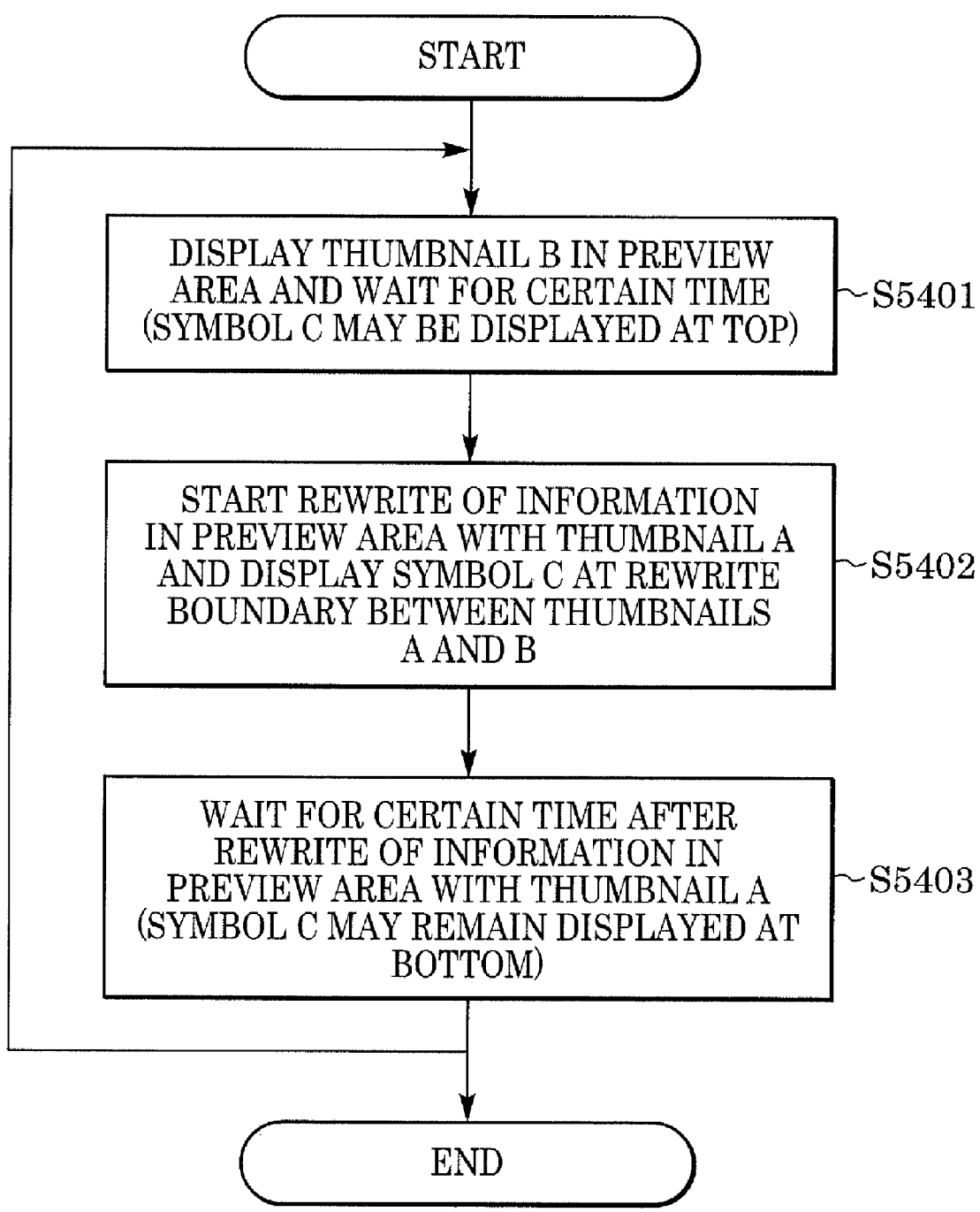
FIG. 23 is a flowchart showing display operation control shown in FIG. 22.

FIG. 23 is a flowchart for a control process of the display operation shown in FIG. 22. This process corresponds to that executed in step S5106 of FIG. 20.

First, in step S5401, the thumbnail B is displayed in the preview area, and the system waits for a certain time. Then, in response to a timer event, the thumbnail B is gradually rewritten (replaced), in step S5402, with the thumbnail A, which is already prepared at that time, from the upper side of the preview area. Correspondingly, the symbol C is moved so as to always position at the rewrite boundary between the thumbnails A and B. If step S5402 is completed and the image in the preview area is all rewritten with the thumbnail A, the system waits for a certain time in step S5403 while displaying the thumbnail A. Then, processing returns to step S5401 to repeat the rewrite process again. Finally, processing of the display operation ends in response to stop of the preview. From the viewpoint of the afterimage effect described above, the time during which both the thumbnails A, B are displayed in step S5402 under rewrite is preferably set longer than the time during which the system waits while displaying the thumbnail A, B in each step S5403, S5401.

In this embodiment described above, the state of a print added with the copy-forgery-inhibited pattern image and the state of a copy of the print are displayed by switching display on the same screen or dividing it into two display areas, but the present invention is not limited to those application forms. For example, those two states may be displayed in two separate display areas adjacent to each other for comparative observation. In this case, while the afterimage effect is not obtained, the user can recognize the difference between the two images from the comparison, and hence visually discern the presence of the latent image and the background image in relative positional relation.

Figure 24:
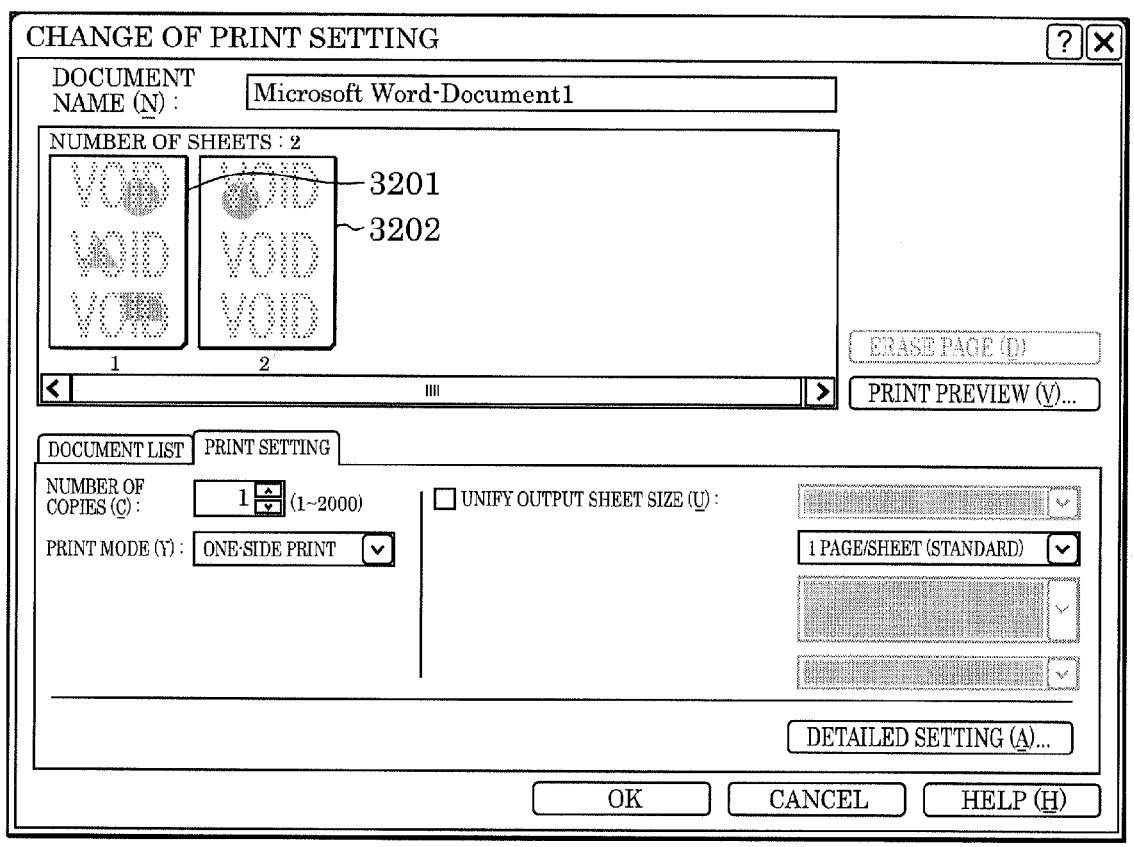
FIG. 24 shows a display example provided by a setting change editor for causing a user to recognize that the copy-forgery-inhibited pattern printing is set in print jobs.
Figure 25:
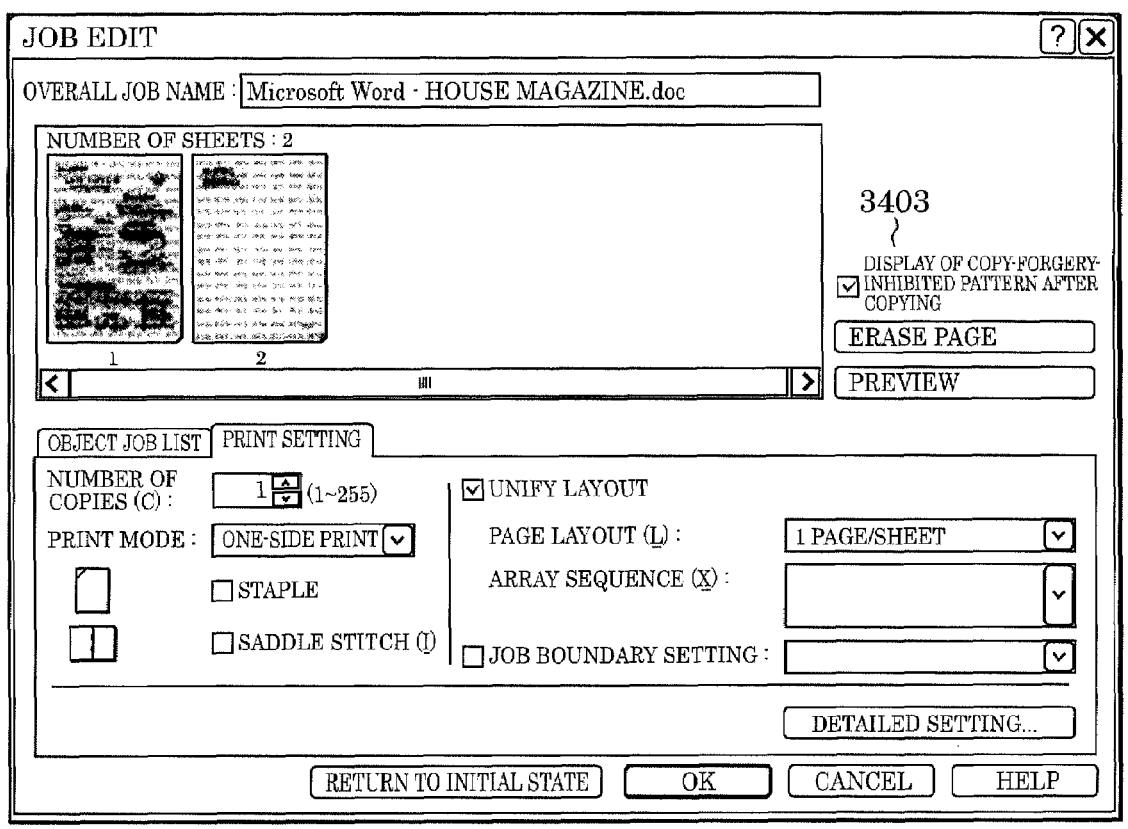
FIG. 25 shows another display example provided by the setting change editor for causing a user to recognize that the copy-forgery-inhibited pattern printing is set in print jobs.

FIGS. 24 and 25 show other examples of the preview display of the copy-forgery-inhibited pattern image.

FIG. 24 shows a display example causing the user to recognize that the copy-forgery-inhibited pattern printing is set in the print job prepared by the setting change editor 307. As mentioned before, because the copy-forgery-inhibited pattern image is an image drawn by dots, the image is not displayed as originally intended when the copy-forgery-inhibited pattern image produced in match with the printer resolution is scaled down to be matched with the display resolution.

Meanwhile, meta data, such as EMF (Enhanced Metafile Format) and SVG (Scalable Vector Format), which is represented by, e.g., font data described as a drawing data file holding graphic information therein, does not depend on resolution, and therefore does not require the reduction process, i.e., the thinning-out process necessitated from the display resolution being low.

More specifically, in this example, when the user desires the preview display, a copy-forgery-inhibited pattern image is produced as follows. Instead of scaling down and displaying a copy-forgery-inhibited pattern image produced by the copy-forgery-inhibited pattern processing unit 205, a basic image used in the copy-forgery-inhibited pattern processing unit 205 for producing the copy-forgery-inhibited pattern image is subjected to processes of resolution conversion and scaling-down corresponding to the resolution and display area of the display. Then, the copy-forgery-inhibited pattern image is produced from the basic image after being subjected to the processes of resolution conversion and scaling-down. Accordingly, the problem resulting from using, for preview, the copy-forgery-inhibited pattern image produced in match with the printer resolution, e.g., deformation of the image contour, can be minimized.

A drawing process for preview, described below, is premised on the use of vector data (meta data). However, the user interface function for image display switching, described below, is not limited to the particular image data format, and the image data to be visualized may be the copy-forgery-inhibited pattern image after being binary coded.

FIG. 25 shows another display example causing the user to more easily recognize that the copy-forgery-inhibited pattern printing is set in the print job prepared by the setting change editor 307 according to this embodiment of the present invention. In this example, a print image before copying and a copy image obtained after copying the print can be displayed in a switching manner at the discretion of the user.

To that end, in this example, a check box "display of copy-forgery-inhibited pattern after copying" 3403 for displaying the copy-forgery-inhibited pattern image after copying is provided on the user interface. By entering a checkmark in the check box 3403, the user can confirm a print image including a copy-forgery-inhibited pattern image that is visualized after copying. In other words, if the check box 3403 is not checked, an image of a print before copying thereof, i.e., an image of a print after being just printed out, is displayed. The copy-forgery-inhibited pattern image displayed at this time comprises a latent-image area and a background-image area. Additionally, when the check box "display of copy-forgery-inhibited pattern after copying" 3403 is checked, the latent-image area visualized after copying may be displayed in a highlighted manner as compared with the case of the check box 3403 being not checked. A highlighting method can be realized, for example, by setting a density level of the latent image visualized after copying to be higher than an actual output density level of the copy-forgery-inhibited pattern image at the time of preview. With such highlighting, the user can more easily visually confirm the area visualized after copying. Another example of the highlighting method is realized by blinking the visualized image or by displaying the visualized image in a more easily recognizable color than the actually set print color of the copy-forgery-inhibited pattern image. Thus, any suitable highlighting method can be used as long as the highlighting enables the user to more easily visually confirm the image visualized after copying as compared with the copy-forgery-inhibited pattern image before copying.

Also, while the above description is made as displaying both the image to be visualized after copying (i.e., the latent image) and the image disappearing or becoming paler after copying (i.e., the background image) as the print image before copying, the present invention is not limited to that display mode. It is also possible to display, as the print image before copying, only the visualized area of the copy-forgery-inhibited pattern image, and to display the visualized area in a highlighted manner, as described above, when the check box "display of copy-forgery-inhibited pattern after copying" 3403 is checked. As an alternative, the copy-forgery-inhibited pattern image may not be displayed in the print image before copying, and the visualized image may be displayed when the check box "display of copy-forgery-inhibited pattern after copying" 3403 is checked.

The above-described display switching function is applicable to not only the setting change editor, but also to the previewer 306 shown in FIG. 12. That function can be further applied to any other suitable preview display unit to provide similar images in a switching manner.

While the check box "display of copy-forgery-inhibited pattern after copying" 3403 is provided in the example of FIG. 25, the user interface may be controlled such that the check box 3403 is allowed to function only when the copy-forgery-inhibited pattern printing is designated by the user. For example, the check box "display of copy-forgery-inhibited pattern after copying" 3403 may be displayed only when the copy-forgery-inhibited pattern printing is designated. Alternatively, the check box 3403 may be grayed out (inactivated) such that the user cannot select it. With such control, userability can be further increased in the preview process of the copy-forgery-inhibited pattern image.

Further, while the example of FIG. 25 employs the check box and the menu as the user interface for displaying the copy-forgery-inhibited pattern after copying, any other suitable user interface can be used as long as display of the copy-forgery-inhibited pattern image after copying can be selected by the user.

Figure 26:
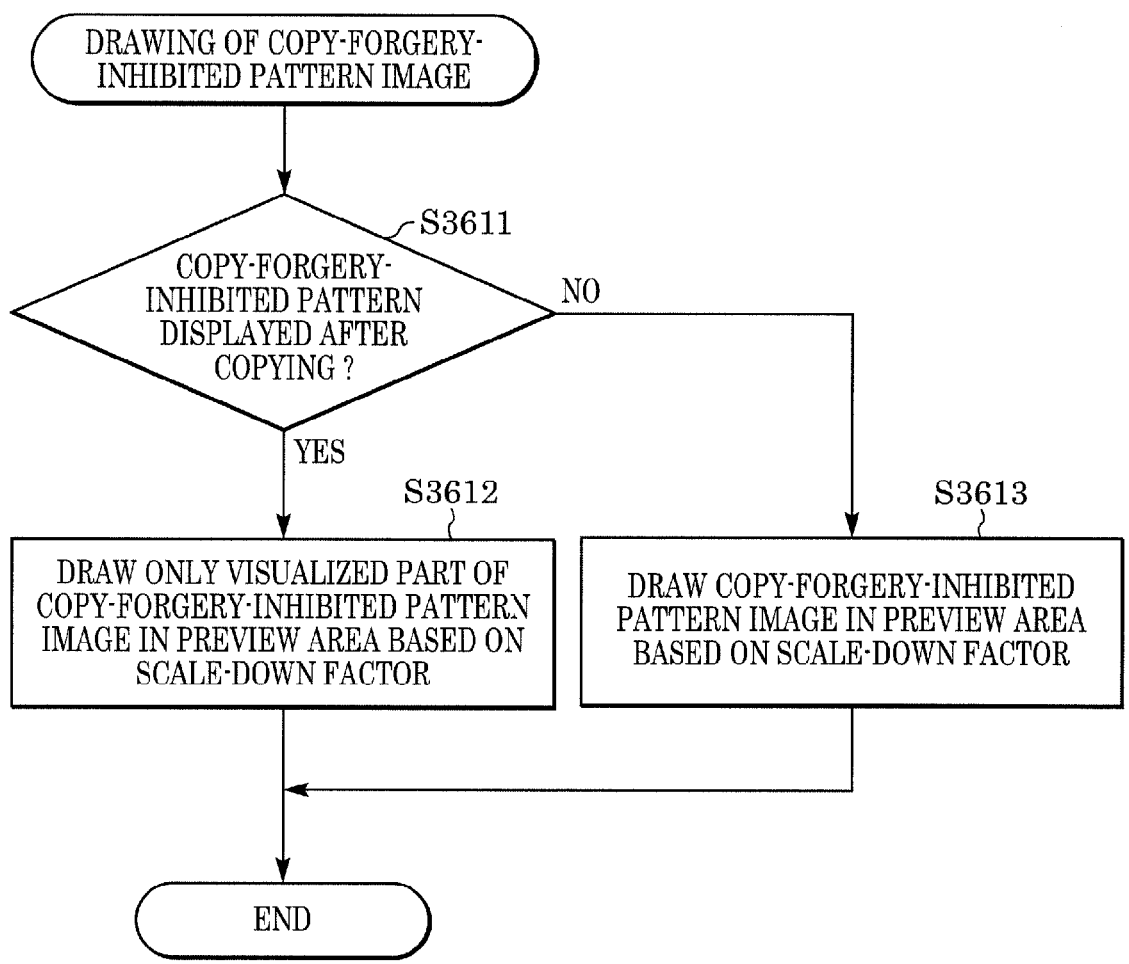
FIG. 26 is a flowchart showing details of a process of previewing a printed output image, including a copy-forgery-inhibited pattern image, according to another embodiment of the present invention.
Figure 27:
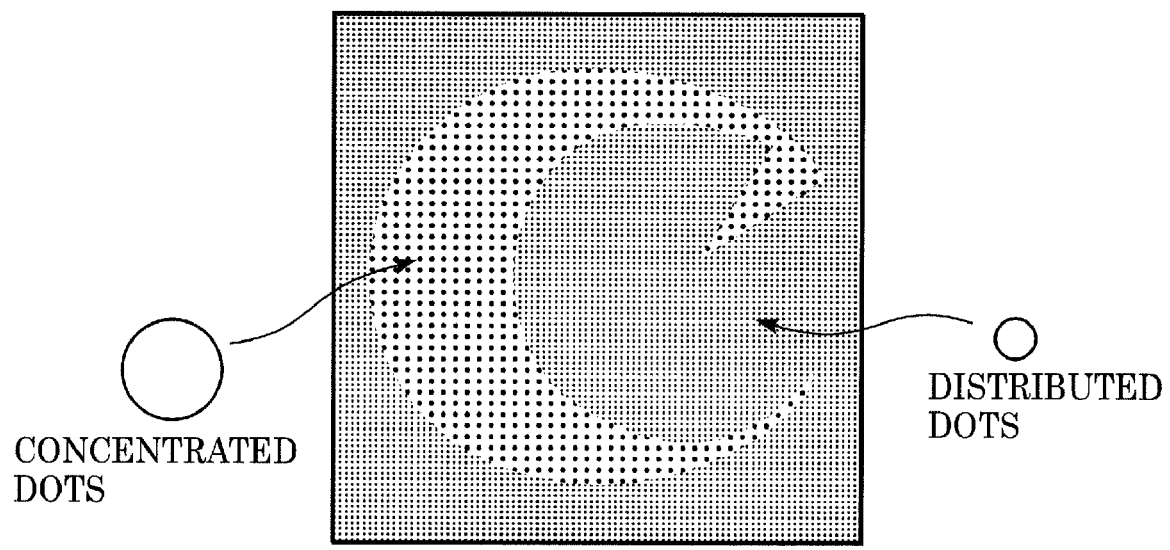
FIG. 27 is an illustration showing two areas of a copy-forgery-inhibited pattern image, i.e., a latent image and a background image.

FIG. 26 is a flowchart showing another example of the process of displaying a preview image of the copy-forgery-inhibited pattern image before copying and a preview image thereof after copying in a switching manner. More specifically, FIG. 26 shows another example of the preview process of the copy-forgery-inhibited pattern image shown in step S3607 or S3610 of FIG. 19. Additionally, FIG. 26 represents a process that is executed on the premise of a previewer having the above-described function of "display of copy-forgery-inhibited pattern after copying". In the case not having that function, only the image visualized after copying may be drawn in the process of drawing the copy-forgery-inhibited pattern image in step S3607 or S3610 of FIG. 19.

First, in step S3611, it is determined whether "display of copy-forgery-inhibited pattern after copying" is set by the user. If it is determined in step S3611 that "display of copy-forgery-inhibited inhibited pattern after copying" is set, processing proceeds to step S3612 where, of the copy-forgery-inhibited pattern image (comprising the latent image and the background image), only the image visualized after copying is drawn in the preview sheet area in accordance with the scale-down factor, which has been calculated in step S3602 of FIG. 19, through the graphics engine 202. That drawing process may be executed so as to highlight the visualized image when displayed, as described above. Processing of FIG. 26 then ends.

On the other hand, if it is determined in step S3611 that "display of copy-forgery-inhibited inhibited pattern after copying" is not set, processing proceeds to step S3613 where the copy-forgery-inhibited pattern image (comprising the latent image and the background image) is drawn.

While the process of drawing the copy-forgery-inhibited pattern image is executed in step S3613 to display both the image visualized after copying (i.e., the latent image) and the image disappearing or becoming paler after copying (i.e., the background image), the present invention is not limited to that display mode. It is also possible to display the image of a print before copying or the image corresponding to a copy of the print after copying. In addition, the copy-forgery-inhibited pattern image may not be displayed in the print image. For example, when the copy-forgery-inhibited pattern image is not displayed in the print image, the process of step S3613 is omitted.

Furthermore, in the process of drawing the copy-forgery-inhibited pattern image, as mentioned above, meta data as a basis for producing the copy-forgery-inhibited pattern image is scaled down to be matched with the display area instead of scaling down the copy-forgery-inhibited pattern image in a grid of dots, following which the copy-forgery-inhibited pattern image for preview is produced based on the scaled-down image. Processing of FIG. 26 then ends.

According to each of the embodiments of the present invention, as described above, the user can easily recognize, e.g., the state of the copy-forgery-inhibited pattern image being added to the document data, and the state of a copy obtained by copying a print including the copy-forgery-inhibited pattern image.

As a result, with preview in the copy-forgery-inhibited pattern printing, the user can easily confirm whether the intended copy-forgery-inhibited pattern image is properly added to the image to be output for printing.

Other Embodiments

The present invention can be applied to not only a system comprising plural units of equipment (such as a host computer, an interface unit, a reader, and a printer), but also to a device comprising one unit of equipment (such as a copier, a printer, or a facsimile).

The embodiments are described above on the premise of the present invention being implemented by a host computer. However, when the process of producing the copy-forgery-inhibited pattern image can be executed in a copier or a printer, a preview is displayed on a control screen prepared in the copier or the printer.

A storage medium, which stores program code of software for realizing respective steps of the flowcharts shown in the drawings to implement the functions of any of the above-described embodiments, may be provided to a system or an apparatus, and cause a computer (central processing unit (CPU) or micro-processing unit (MPU)) in the system or the apparatus to read and execute the program code stored in the storage medium.

Storage media for storing and providing the program code may be, e.g., floppy disks, hard disks, optical disks, magneto-optical disks, compact disk-read-only memory (CD-ROM), compact disk-recordable (CD-R), magnetic tapes, nonvolatile memory cards, and ROM.

Also, the functions of any of the above-described embodiments are realized not only by a computer executing program code read out of the storage medium, but also by an Operating System (OS) or the like which is running in the computer and executes a part or the whole of the actual processing in accordance with commands from the program code, in order to realize the functions of any of the above-described embodiments.

Further, the present invention involves the case in which program code read out of the storage medium are written in a memory provided in a function add-on board inserted in the computer or a function add-on unit connected to the computer, and a CPU or the like incorporated in the function add-on board or unit executes a part or the whole of the actual processing in accordance with commands from the program code, in order to realize the functions of any of the above-described embodiments.

In other words, the foregoing description of embodiments has been given for illustrative purposes only and not to be construed as imposing any limitation.

The scope of the invention is, therefore, to be determined solely by the following claims and not limited by the text of the specifications and alterations made within a scope equivalent to the scope of the claims fall within the true spirit and scope of the invention.

What is claimed is:

1. An information processing device comprising:
    a receiving unit which receives a character string which is concealed on a print product and appears on a copy product of the print product, wherein the received character string is for copy-forgery-inhibited pattern image data;
    a generating unit which generates printing data in which dots are concentrated into masses in a first area and dots are distributed in a second area and in which either of the first area and the second area is based on the received character string, such that the print product is produced by an image forming device; and
    a display controlling unit which controls display of first image data and second image data, such that a user recognizes the difference between the print product and the copy product of the print product, wherein the second image data is different from the first image data, and the received character string appears in the second image data.

2. An information processing device according to claim 1, wherein the received character string does not appear in the first image data.

3. An information processing device according to claim 1, wherein the received character string appears more highlighted in the second image data than in the first image data.

4. An information processing device according to claim 1, wherein density height in the first area of the second image data is different than density height in the second area of the second image data.

5. An information processing device according to claim 1, wherein the display controlling unit controls display of the first image data and the second image data on the display controlling unit after each of the first image data and the second image data are combined with document image data.

6. An information processing device according to claim 1, wherein the display controlling unit performs display switching to control displaying the first image data or the second image data based on an instruction from the user.

7. An information processing device according to claim 1, wherein the display controlling unit performs display switching to control displaying the first image data or the second image data at intervals of a predetermined time.

8. An information processing device according to claim 1, wherein the display controlling unit controls display of the first image data and the second image data at the same time across a boundary.

9. An information processing device according to claim 8, wherein the display controlling unit moves the boundary.

10. An information processing device according to claim 1, wherein the first area is based on the received character string and the second area is surrounding the first area in the printing data, and wherein the density height of the first area is thicker than the second area in the second image data.

11. An information processing method comprising:
    receiving a character string which is concealed on a print product and appears on a copy product of the print product, wherein the received character string is for copy-forgery-inhibited pattern image data:
    generating printing data in which dots are concentrated into masses in a first area and dots are distributed in a second area and in which either of the first area and the second area is based on the received character string, such that the print product is produced by an image forming device; and
    controlling, by a display controlling unit, display of first image data and second image data, such that a user recognizes the difference between the print product and the copy product of the print product, wherein the second image data is different from the first image data, and the received character string appears in the second image data.

12. An information processing method according to claim 11, wherein the received character string does not appear in the first image data.

13. An information processing method according to claim 11, wherein the received character string appears more highlighted in the second image data than in the first image data.

14. An information processing method according to claim 11, wherein density height in the first area of the second image data is different than density height in the second area of the second image data.

15. An information processing method according to claim 11, wherein the display controlling unit controls display of the first image data and the second image data on the display controlling unit after each of the first image data and the second image data are combined with document image data.

16. An information processing method according to claim 11, wherein the display controlling unit performs display switching to control displaying the first image data or the second image data based on an instruction from the user.

17. An information processing method according to claim 11, wherein the display controlling unit performs display switching to control displaying the first image data or the second image data at intervals of a predetermined time.

18. An information processing method according to claim 11, wherein the display controlling unit controls display of the first image data and the second image data at the same time across a boundary.

19. An information processing method according to claim 18, wherein the display controlling unit moves the boundary.

20. An information processing method according to claim 11, wherein the first area is based on the received character string and the second area is surrounding the first area in the printing data, and wherein the density height of the first area is thicker than the second area in the second image data.

21. A computer-readable storage medium for storing the computer-executable process steps of an information processing method comprising:

receiving a character string which is concealed on a print product and appears on a copy product of the print product, wherein the received character string is for copy-forgery-inhibited pattern image data;

generating printing data in which dots are concentrated into masses in a first area and dots are distributed in a second area and in which either of the first area and the second area is based on the received character string, such that the print product is produced by an image forming device; and controlling display of first image data and second image data, such that a user recognizes the difference between the print product and the copy product of the print product, wherein the second image data is different from the first image data, and the received character string appears in the second image data.

22. A computer-readable storage medium according to claim 21, wherein the received character string does not appear in the first image data.

23. A computer-readable storage medium according to claim 21, wherein the received character string appears more highlighted in the second image data than in the first image data.

* * * * *